United States Patent [19]
Sugita et al.

[11] Patent Number: 5,311,494
[45] Date of Patent: May 10, 1994

[54] OPTICAL DISK APPARATUS AND OPTICAL HEAD

[75] Inventors: Tatsuya Sugita; Yoshio Sato, both of Hitachi; Nobuyoshi Tsuboi, Ibaraki; Hiroyuki Minemura; Hisashi Andoh, both of Hitachi, all of Japan

[73] Assignee: Hitachi, Ltd., Tokyo, Japan

[21] Appl. No.: 788,242

[22] Filed: Nov. 5, 1991

[30] Foreign Application Priority Data

Nov. 5, 1990 [JP] Japan .................. 2-297315

[51] Int. Cl.$^5$ .............................. G11B 7/00
[52] U.S. Cl. .................. 369/100; 369/110; 369/44.22; 369/44.23
[58] Field of Search ............ 369/114, 115, 117, 72, 369/280, 282, 290, 44.23, 44.24, 44.22, 44.26, 44.14, 44.17, 44.35; 359/719, 764, 718, 717

[56] References Cited

U.S. PATENT DOCUMENTS

| | | | |
|---|---|---|---|
| 4,477,894 | 10/1984 | Clurman | 369/270 |
| 4,525,040 | 6/1985 | Nakamura | 359/794 |
| 4,635,244 | 1/1987 | Gotoh | 359/495 |
| 4,742,219 | 5/1988 | Ando | 369/44.23 |
| 4,965,785 | 10/1990 | Tadokoro et al. | 369/44.23 |
| 5,077,726 | 12/1991 | Dodds et al. | 369/291 |
| 5,105,407 | 4/1992 | Ishika | 369/44.37 |
| 5,162,949 | 11/1992 | Kubota | 359/718 |
| 5,181,194 | 1/1993 | Horie | 369/44.33 |

FOREIGN PATENT DOCUMENTS

| | | |
|---|---|---|
| 236503 | 9/1987 | European Pat. Off. . |
| 269411 | 6/1988 | European Pat. Off. . |
| 60-079581 | 5/1985 | Japan . |
| 61-267940 | 11/1986 | Japan . |
| 62-062441 | 3/1987 | Japan . |
| 8800870 | 11/1989 | Netherlands . |
| 2072924 | 10/1981 | United Kingdom . |

*Primary Examiner*—Constantine Hannaher
*Assistant Examiner*—Don Wong
*Attorney, Agent, or Firm*—Antonelli, Terry, Stout & Kraus

[57] ABSTRACT

An overwritable optical disk apparatus in which a finite conjugate optical system is employed. The apparatus comprises an optical head for converging diffused light from a light source onto an optical disk for performing data write/read operation, a driving unit for rotating the disk and a beam splitter for guiding the light reflected from the optical disk to a photodetector for detecting light reflected from the optical disk. Influence of disk displacement occurring in accompanying the rotation of the disk and disk eccentricity are suppressed to a minimum by encasing rotatably the optical disk within a credit card size casing which is adapted to be loaded and held stationarily in the optical disk apparatus. Thin structure of the optical head and miniaturization of the optical disk apparatus are realized with light utilization efficiency for data write/read operation being increased.

11 Claims, 18 Drawing Sheets

F I G. 1
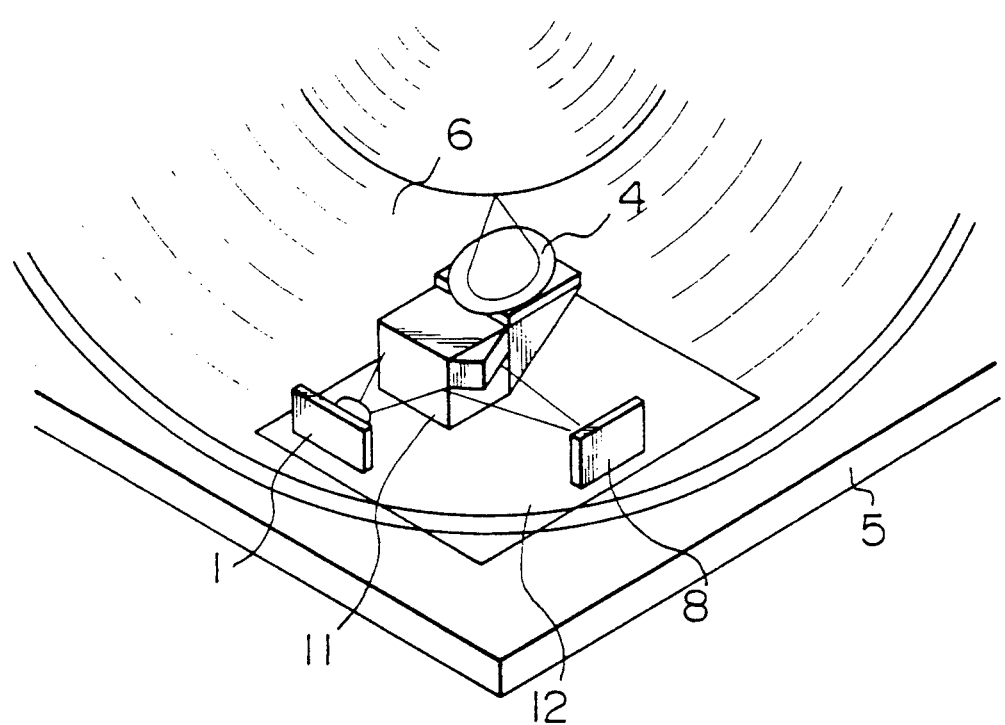

F I G. 4
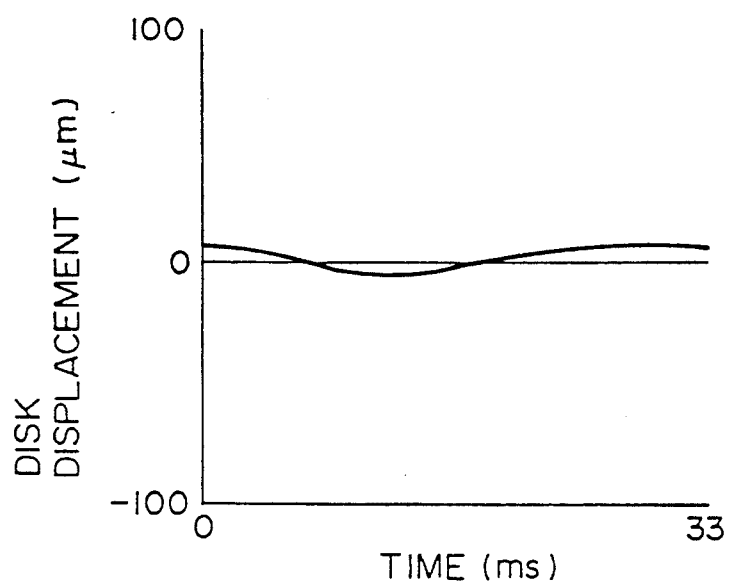
F I G. 5
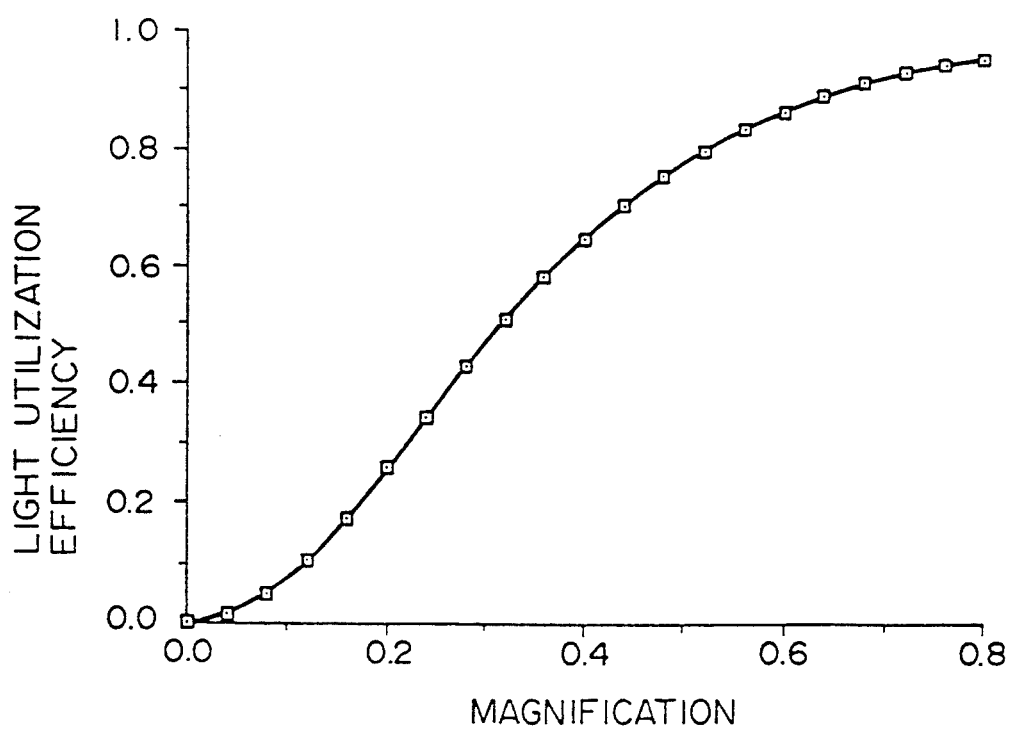

WHEN UNUSED

WHEN USED

WHEN UNUSED

WHEN USED

WHEN UNUSED

WHEN USED (1)

OPTICAL DISK APPARATUS AND OPTICAL HEAD

BACKGROUND OF THE INVENTION

The present invention relates to an optical disk apparatus in which an optical head constituted by a finite conjugate optical system is employed. More particularly, the present invention is concerned with an overwritable optical disk apparatus.

As a hitherto known optical disk system or apparatus equipped with an optical head in which a finite conjugate optical system is made use of, there can be mentioned an optical disk system which is designed only for reproduction or reading of data from a compact disk (known as CD for short) or the like.

Concerning the optical head which is based on the finite conjugate optical system and destined for use in reproduction of the CD, there has already proposed for practical applications an optical system of a simplified structure such as described, for example, in Sigeo Kubota: "HIKARI DISUKU YOU NO PIKKU APPU NO KOCATA, KEIRYOU, KANSOKA (IMPLEMENTATION OF PICK-UP FOR OPTICAL DISK IN MINIATURIZED AND SIMPLIFIED STRUCTURE OF LIGHT WEIGHT), KOUGAKU (OPTICS)", Vol. 16, No. 8 (1987). A light beam emitted from a light source constituted by a semiconductor laser such as typified by a laser diode is guided to an objective lens through the medium of a half mirror, whereby the light beam is converged into a light spot on an optical disk. The light reflected from the optical disk is picked up by an objective lens and directed to a photodetector by way of the abovementioned half mirror. The light beam traveling along the optical path extending between the laser diode and the objective lens is not collimated. This optical system of this type is therefore referred to as the finite conjugate optical system.

In the optical disk system or apparatus, there take place unavoidably disk displacement or disk fluttering as well as eccentricity in the course of rotation of the optical disk. Under the circumstances, there are required a focusing control mechanism for causing a point of light convergence or focused light spot to lie always on a recording surface of the optical disk and a tracking control mechanism for controlling the light spot so that it follows one and the same track. Such focusing and the tracking control can be realized by moving correspondingly the objective lens in two axial directions by means of a two-dimensional actuator. The signal for this control has to be derived from the light reflected from the optical disk.

In conjunction with the focusing and tracking control mentioned above, the finite conjugate optical system suffers a problem that because the lens is moved in the atmosphere of the diffused light flux, the focusing and the tracking are accompanied with appearance of aberration, making it impossible or at least difficult to condense or converge the light beam satisfactorily, resulting unwantedly in deformation of the light spot produced by converging the light. Besides, the finite conjugate optical system suffers such difficulty that efficiency of utilization of light energy (hereinafter also referred to as light utilization efficiency) undergoes fluctuation to thereby bring about undesirable variation in the light energy level on the disk recording surface. For these reasons, it is generally considered that the finite conjugate optical system can not find application in the optical disk apparatus of the write-once and rewritable types in which high light energy demanded on a recording surface of the optical disk.

SUMMARY OF THE INVENTION

Accordingly, it is an object of the present invention to provide an overwritable type optical disk apparatus in which a finite conjugate optical system can be made use of effectively and profitably.

Another object of the present invention is to provide a novel optical disk structure which can advantageously be used in the abovementioned optical disk apparatus.

In view of the above and other objects which will be apparent as description proceeds, there is provided according to an aspect of the present invention an optical disk apparatus which comprises an optical head for converging diffused light from a light source onto an optical disk for performing at least data writing operation (recording operation), a driving unit for rotating the optical disk, a facility for suppressing disk displacement or fluttering occurring in accompanying the rotation of the optical disk, a casing unit for accommodating and positioning the optical disk carrying data at a position bearing a predetermined relation to the optical head, and a drive circuit for controlling operations of the optical head and the driving unit.

The optical head used in the optical disk apparatus according to the invention should preferably be composed of a semiconductor laser typified by a laser diode serving as the light source, an objective lens for converging diffused light emitted from the light source onto the optical disk, a light separator for guiding the light reflected from the optical disk to a photodetector which is adapted for detecting the light reflected from the optical disk.

The semiconductor laser or laser diode used as the light source incorporated in the optical head may be selected appropriately in respect to the wavelength, power, divergent angle and other factors in dependence on practical applications.

The objective lens as used in the optical head according to the invention may also be selected appropriately in respect to the numerical aperture, magnification, focal length and other factors, as application requires.

The light separator mentioned above may advantageously be realized by using a polarizing beam splitter and a quarter-wave plate ($\lambda$/4 plate). Alternatively, a half mirror may be used to this end.

In case the half mirror is used as the light separator, reflectivity R and transmittance T of the half mirror should preferably satisfy the following conditions:

(1) Condition that $R \geq T$ in case the light emitted from the light source is directed to the optical disk after having been reflected by the half mirror.

(2) Condition that $R \leq T$ in case the light emitted from the light source reaches the optical disk after having transmitted through the half mirror.

As to the disk displacement occurring in accompanying the rotation of the optical disk described hereinbefore, this phenomenon should preferably be suppressed to such extent that the converged light forms a write/read light spot on the disk.

According to another aspect of the invention, there is provided an optical disk apparatus which comprises an optical head for converging diffused light emitted from a light source onto an optical disk for performing at least data writing operation, a drive unit for rotating the optical disk, a facility for suppressing disk displacement which occurs in accompanying the rotation of the optical disk, a casing/positioning unit for accommodating the optical disk at a position bearing a predetermined relation to the optical head and a drive circuit for controlling operations of the optical head and the driving unit.

With the structures of the optical disk apparatuses according to the present invention descried above, a finite conjugate optical system can be adopted for the optical head while the disk displacement and eccentricity can be reduced significantly, whereby the light utilization efficiency can be remarkably enhanced.

By adopting the measures taught by the invention for reducing the displacement and eccentricity of the optical disk, an optical disk apparatus can be realized which is capable of recording by using an optical head incorporating a finite conjugate optical system.

As one of methods for diminishing the disk displacement, there is proposed according to the invention to house or accommodate the optical disk within a casing with small spaces or gaps between the inner surfaces of the casing and the optical disk to thereby physically confine the displacement of the optical disk to within a predetermined range delimited by the inner spaces or gaps.

Further, it is preferred to provide a restraining member for restricting the disk displacement in the apparatus or device in which the optical disk is loaded upon operation. With this structure, it is possible to further suppress the disk displacement through cooperation with the disk accommodating casing structure.

The eccentricity can also be suppressed by providing at least one of the casing and the optical disk with a projection or a groove for limiting the eccentricity.

Alternatively, the influence of eccentricity may be suppressed by providing the optical disk apparatus with a frame.

Of course, when the disk flatness is satisfactory or a camber thereof is negligible or when a shaft of the driving unit for rotating the optical disk does not suffer any appreciable vibration or when the disk displacement is negligible or when the track center coaxially coincides with the center of rotation of the disk or when the vibration of a shaft or spindle of the disk driving unit is so small as to meet the standardized criterions imposed on the disk displacement and eccentricity, the optical head incorporating the finite conjugate optical system according to the invention can be employed without resorting to the use of the mechanisms for limiting the disk displacement and eccentricity.

According to still another aspect of the present invention, there is provided an optical disk apparatus which comprises at least one optical head capable of working on an optical disk housed within a casing having a transparent portion for performing operation on the data carrying optical disk with light incident through the transparent portion of the casing by converging diffused light from a light source onto the disk, guiding light reflected from the disk to a photodetector and performing at least one of data write, read and erase operation, and an encasing/positioning unit for accommodating the disk at a position bearing a predetermined relation to the optical head.

In a preferred embodiment carrying out the invention, a supporting member having a pliability or flexibility may be interposed between the optical disk and the casing so that the optical disk can rotate while contacting the pliable supporting member.

By rotating the optical disk in the state contacting the supporting member as described above, stabilized rotation of the optical disk can be realized while a data storage or record area of the optical disk can be protected against deposition of dusts or the like.

Further, it is possible to provide the optical disk with a projection to thereby ensure a more stable rotation of the optical disk by preventing the disk displacement.

In case the optical disk is accommodated or housed within a casing, the latter may be provided with an opening (window) or a transparent portion for allowing the disk to be illuminated with the light emitted from the light source through the window or the transparent portion.

As a light transmitting optical member constituting the transparent portion mentioned above, it is preferred to use a light transmissive material such a glass, polycarbonate (hereinafter also referred to as PC for short), polymethylmetacrylate (PMMA) or the like.

In this conjunction, it should be mentioned that the casing may be formed of a light transmissive material as a whole or alternatively only a portion of the casing located in opposition to the optical head may be formed of a light transmissive material with the other portion being formed of a material having no light transmissibility.

The objective lens employed according to the present invention is designed in consideration of an optical thickness of an optical member such as a base or substrate which intervenes between the objective lens and a recording medium of the optical disk. Accordingly, when the light is introduced through an optical member forming the transparent portion of the casing, the objective lens is designed by taking into consideration the thickness of the optical member as well as that of the substrate (base) of the optical disk. Under the circumstances, when a conventional objective lens is used in carrying out the invention, it is preferred to select the thickness of the optical member and that of the substrate (base) of the optical disk such that the sum of both thicknesses is equal to that of the substrate (base) of the disk used heretofore. In a preferred embodiment of the invention in which the optical disk is accommodated within the casing as described above, the substrate or base of the optical disk can be made thin when a conventional objective lens is used, because the light is introduced through the light transmitting optical member forming a light incidence window of the casing or the casing itself when the latter is formed of a light transmissive material.

According to yet another aspect of the invention, there is provided an optical disk apparatus which comprises an optical head for performing operation on a rotating data carrying optical disk which undergoes a displacement not greater than 0.25 mm during rotation thereof, wherein the optical head performs at least data writing on the optical disk by converging diffused light from a light source by a lens disposed with a working distance in a range of 5 to 20 mm relative to the light source, a driving unit for rotating the optical disk, and an encasing/positioning unit for accommodating the optical disk at a position bearing a predetermined relation to the optical head.

Magnitude of the disk displacement taking place in accompanying the rotation of the optical disk may be regulated, for example, by a method described in Yoshihiro Okino: "HIKARI DISUKU PUROSESU GIJUTSU NO YOTEN (THE GISTS OF OPTICAL DISK PROCESS TECHNOLOGY)", pp. 166-172 (Edition by Hitachi Industrial Technology Center).

In order to increase the light utilization efficiency in the finite conjugate optical system, it is preferred to decrease the distance between the light source and the objective lens.

According to yet another aspect of the present invention, there is provided an optical disk apparatus which comprises an optical head working on a rotating data carrying optical disk by performing at least data writing operation on the optical disk by converging diffused light emitted from a light source onto the disk through a lens having a numerical aperture in a range of 0.5 to 0.6 mm and disposed with a working distance in a range of 0.25 to 1.0 mm, a driving unit for rotating the optical disk, and an encasing/positioning unit for accommodating the optical disk at a position bearing a predetermined relation to the optical head.

At this juncture, description will be made of a relation between the numerical aperture and a (light) beam diameter. Representing by f a distance from a principle point of a lens to a recording surface of the optical disk while representing by D the radius of the lens, the numerical aperture NA is given by $$NA = \frac{D}{f}$$

The beam diameter d at the point of convergence is determined by the numerical aperture NA and the wavelength λ of the light beam. At a diffraction limit, the beam diameter d is given by $$d = \frac{\lambda}{NA}$$

When data is written, read or erased by using the optical head, it is necessary to maintain constant the beam diameter. Accordingly, it is preferred to maintain constant the numerical aperture NA as well. In this conjunction, it will be understood that the lens diameter D becomes small by decreasing the focal length f while holding constant the numerical aperture NA.

In order to ensure compatibility with the conventional apparatus, it is necessary to select the beam diameter to be equal to that of the conventional apparatus. Accordingly, when a laser diode emitting a wavelength of 830 nm is used as the light source, it will readily be understood that the numerical aperture NA has to be greater than 0.5 inclusive. Needless to say, by increasing the numerical aperture NA while decreasing the beam diameter, energy density can be increased, making it possible to perform the write operation with a low power at the recording film surface.

On the other hand, as the numerical aperture NA is increased, aberration due to move or displacement of the lens upon focusing and tracking will become significant. In consideration of this fact together with the lens manufacturing conditions, it is preferred to set the upper limit of the effective numerical aperture NA at 0.6.

The beam diameter d can be reduced also by shortening the wavelength λ, which is advantageous for the writing operation.

In this conjunction, the light source may preferably be constituted by a laser diode capable of emitting a wavelength in a range of 780 nm to 830 nm or a light source having a wavelength shortened to a half, i.e. in a range of 390 nm to 415 nm by making use of second harmonic. In this case, the beam diameter d should preferably be in a range of 0.65 μm to 1.65 μm.

The numerical aperture of the objective lens at the side facing the light source should not be smaller than 0.1. A greater numerical aperture can improve correspondingly the light utilization efficiency. In this conjunction, it is noted that light beam emitted from the laser diode is elliptical in cross-section, thus giving rise to appearance of a light intensity distribution internally of the objective lens. When this fact is taken into account along with the lens manufacturing condition or tolerance, the numerical aperture of the lens at the side facing the light source should preferably be smaller than 0.18 inclusive.

With the numerical lens aperture of 0.18 at the side facing the light source, the light utilization efficiency amounts to 50%. It can be seen that since the angle of divergence of the light beam emitted from the laser diode differs in dependence on the types thereof, an equivalent light utilization efficiency can be achieved even with a lens having a smaller numerical aperture at the side facing the light source by using a laser diode having a small beam divergence angle.

Now, representing by m magnification of the objective lens, while representing by A the distance from the objective lens to a point of convergence of light and by B the distance from the light source to the objective lens, there exists a relation given by $$B = mA$$

The distance B between the objective lens and the optical disk is determined by magnitude of displacement of the optical disk. In the case of an optical disk undergoing significant displacement, the distances A and B increase. To say in another way, the size of the optical head can be determined by magnitude of the disk displacement.

In order to increase the light utilization efficiency in the finite conjugate optical system as contemplated by the present invention, it is preferred to increase the numerical aperture for thereby realizing a high light utilization efficiency.

On the other hand, when the numerical aperture is increased, aberration due to displacement of the objective lens upon focusing and tracking operations become more remarkable when compared with the case where the numerical aperture is small. Variation in the light utilization efficiency is also significant.

In this conjunction, it should be mentioned that according to the present invention, displacement of the objective lens for focusing and tracking operations can be made small owing to suppression of the disk displacement and the eccentricity even when the numerical aperture of the objective lens at the side facing the light source is increased, whereby aberration making appearance can be suppressed to the value comparable to that of the conventional optical system. Thus, the light utilization efficiency of the finite conjugate optical system can be increased, which allows the finite conjugate optical system to be used in the optical head capable of writing operation.

The light utilization efficiency of the finite conjugate optical system can be determined on the basis of the numerical aperture and magnification of the objective lens.

Explanation will here be made of a relation between the magnification m and the light utilization efficiency of the finite conjugate optical system. The magnification m ca be expressed by $$m = NA_2/NA_1$$

where $NA_2$ represents a numerical aperture of an objective lens as viewed from the light source, and $NA_1$ represents a numerical aperture of the lens when viewed from the side of the optical disk.

By way of example, let's calculate the light utilization efficiency on the assumptions that $NA_1=0.52$, divergence of light in the direction parallel to a junction plane of a laser diode used as the light source is given by $\theta// = 11°$ and that divergence of light in the direction perpendicular to the junction plane is given by $\theta\perp = 25°$. In the case where an inorganic material is used for forming a recording medium or film on the optical disk, there is required a light beam power which exceeds 10 mW at the recording film surface. Accordingly, in order to allow a laser diode having a power of 40 mW to be used as the light source, the light utilization efficiency has to be 25% at the lowest. It will be understood that in order to achieve the light utilization efficiency exceeding 25% as determined by the calculation, the magnification m has to be at least 0.2.

Next, description will be directed to the working distance of lens.

In the case where the optical disk is accommodated or encased within a casing and light is introduced through the medium of an optical member constituting a part of the casing, the distance between the objective lens and the optical disk (i.e. working distance of lens) can be shortened because of interposition of the casing between the objective lens and the optical disk and because of no possibility of direct contact between the rotating optical disk and the objective lens. In correspondence to the disk displacement not greater than 0.25 mm, the working distance should preferably be within 1 mm at the longest.

By reducing the working distance, a distance between the principle point of the lens and the point of convergence can be made shorter. Since the disk displacement not exceeding ±0.5 mm can be realized according to the present invention, the distance from the principle point of the lens to the recording film surface of the optical disk can be made shorter than 4 mm inclusive, while the distance between the light source and the objective lens can be made to lie within 20 mm even when the objective lens having magnification of 0.2 is employed.

According to still another aspect of the present invention, there is provided an optical disk apparatus which comprises an optical head working on a rotating data carrying optical disk for performing at least writing of data on the optical disk by converging diffused light emitted from a light source of a predetermined wavelength through a lens having a predetermined numerical aperture, wherein ratio of the wavelength and the aperture number is selected to fall within a range of 0.65 to 1.66 μm with a utilization efficiency of the light being in a range of 25 to 50%, and an encasing/positioning unit for accommodating the optical disk at a position bearing a predetermined relation to the optical head.

According to a further aspect of the present invention, there is provided an optical disk apparatus which comprises an optical head for performing operation on a rotating data carrying optical disk which undergoes disk displacement not greater than 0.25 mm during rotation, wherein the optical head performs at least data writing operation on the optical disk by converging diffused light emitted from a light source through a lens having a diameter in a range of 1 to 4 mm to thereby illuminate the optical disk with 25 to 50% of the light amount emitted from the light source for performing at least data writing operation on the optical disk, a driving unit for rotating the disk, and an encasing/positioning facility for accommodating the optical disk at a position bearing a predetermined relation to the head.

According to a still further aspect of the present invention, there is provided an optical disk apparatus which comprises an optical head working on a rotating data carrying optical disk which undergoes displacement not greater than 0.25 mm during rotation, wherein the optical head performs at least data writing operation on the optical disk by converging diffused light from a light source through a lens located at a working distance in a range of 0.25 to 1.0 mm from the light source, a driving unit for rotating the optical disk, and an encasing/positioning unit for accommodating the disk at a position bearing a predetermined relation to the head.

According to a yet further aspect of the present invention, there is provided an optical disk apparatus which comprises an optical head working on a rotating data carrying optical disk for performing at least data writing operation on the optical disk by converging diffused light from a light source onto the disk with an intensity of 5 to 25 mW through a lens having a magnification in a range of 0.2 to 0.35, and an encasing/positioning unit for accommodating the disk at a position bearing a predetermined relation to the head.

According to another aspect of the present invention, there is provided an optical disk apparatus which comprises a light separator for illuminating an optical disk with diffused light from a light source and guiding the light reflected from the disk to a photodetector and a lens provided on an optical path between the light separator and the optical disk for converging the diffused light onto the disk to thereby perform at least data writing on the disk.

According to the present invention, the optical path length between a light source and a lens can be shortened, whereby the utilization efficiency of light emitted from the light source can be increased. By virtue of this feature, it has now become possible to write or record data on an optical disk even with an optical head implemented by using the finite conjugate optical system.

As will be understood from the above description, according to the teachings of the invention, the light utilization efficiency of the optical head incorporating a finite conjugate optical system can be increased because of suppression of the disk displacement and eccentricity.

Besides, owing to suppression of the disk displacement, the working distance of the objective lens can be shortened, which in turn means that the distance between the light source and the objective lens can be decreased, to thereby allow the optical head to be implemented in a miniaturized size.

BRIEF DESCRIPTION OF THE DRAWINGS

FIG. 1 is a fragmentary perspective view showing schematically a structure of an optical head and an optical disk according to an embodiment of the present invention;

FIG. 4 is a graphical view for illustration disk displacement of an optical disk encased within a casing;

FIG. 5 is a view for graphically illustrating a relation between magnification of a finite conjugate optical system and a light utilization efficiency;

DESCRIPTION OF THE PREFERRED EMBODIMENTS

Figure 2:
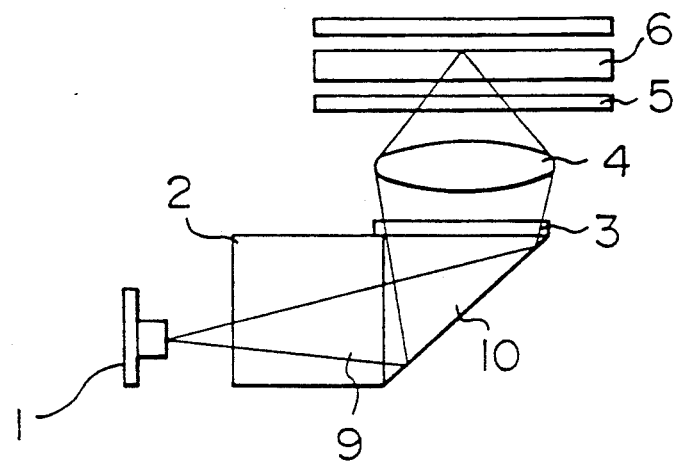
FIG. 2 is a sectional view showing a structure of an optical head according to an embodiment of the present invention.

Now, the present invention will be described in detail in conjunction with exemplary embodiments by reference to the drawings.

FIG. 1 is a fragmentary perspective view showing a structure of an optical disk apparatus including a data storage medium and an optical head according to an embodiment of the present invention.

Referring to the figure, the optical head includes a laser diode 1 serving as a light source, a compound prism 11, an objective lens 4, a photodetector 8, a two-dimensional actuator not shown for moving the objective lens 4 upon focusing and tracking operations, and a chassis 12 for mounting fixedly the abovementioned constituent parts.

On the other hand, the data storage medium of a disk-like configuration (hereinafter referred to as "optical disk") 6 is contained within a transparent casing 5.

FIG. 2 is a sectional view showing schematically the optical head and the optical disk shown in FIG. 1. A light beam 9 emitted from the laser diode 1 serving as the light source is transmitted through a polarized beam splitter 2, raised up by a raiser mirror 10, polarized circularly by a quarter-wave plate 3 and impinges on the objective lens 4 to be converged onto a recording surface of the optical disk 6. The optical disk 6 is contained within a transparent casing 5, wherein the laser beam 9 is converged onto the recording surface of the optical disk 6 through the transparent casing 5. Light reflected from the optical disk 6 is linearly polarized, being rotated 90° relative to the light incident to the quarter-wave plate 3. The linear polarized light is reflected by the polarized beam splitter 2 to be detected by the photodetector 8 (FIG. 1). The illustrated optical head can be realized, for example, in a length of 25 mm, a width of 15 mm and a height of 5.5 mm.

Figure 3A:
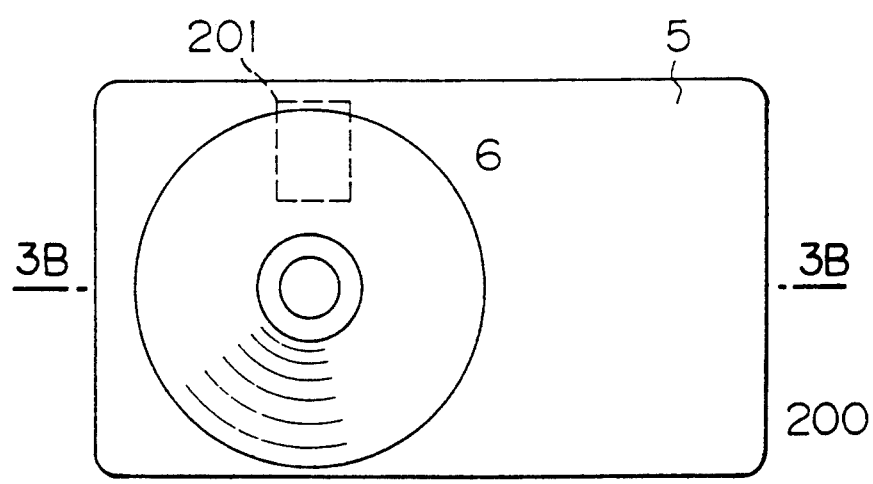
FIG. 3A is a top plan view of an optical disk assembly (also referred to as optical disk-in card) according to an embodiment of the present invention.
Figure 3B:
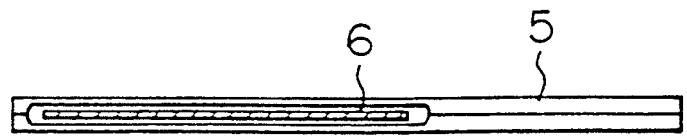
FIG. 3B is a sectional view of the same taken along a line 3B—3B in FIG. 3A.

FIGS. 3A and 3B show an embodiment of an optical disk assembly (also referred to as optical disk-in card) which includes an optical disk encased or accommodated within a protecting casing. In the illustrated optical disk-in card, the rotatable optical disk 6 is enclosed within the casing 5 which is adapted to be fixedly secured for the purpose of reducing displacement or waving of the optical disk 6.

With this arrangement, magnitude of displacement of the objective lens 4 required for converging the light beam can be reduced, whereby aberration making appearance due to the move of the objective lens can be suppressed to a minimum.

The optical disk-in card may be realized in a credit card size of 84 mm in length, 54 mm in width and 1.5 mm in thickness. As a substrate of the disk, a glass substrate of 1.9 inches in diameter and 0.5 mm in thickness may be used. Of course, a substrate of PC or PMMA may equally be used.

By decreasing the diameter of the optical disk, relative magnitude of the disk displacement o waving (fluttering) can be reduced for a given angle of the displacement. By way of example, displacement of the optical disk of 1.9 inches in diameter can be reduced by a factor of 2/5 or more when compared with an optical disk having a diameter of 5.25 inches (133 mm). In consideration of the disk displacement, the diameter of the optical disk should preferably be made smaller. In practical application, the diameter should desirably be smaller than 2.5 inches (127 mm).

The casing 5 may be formed of a sheet material of PMMA.

A light entrance or incidence portion (window) 201 may be made in a thickness of 0.3 mm. A sum of thickness of the substrate and that of the casing may be 0.8 mm. Upper and lower spaces or gaps between the disk and the inner surfaces of the casing may be 0.2 mm, respectively. On these dimensional conditions, displacement of the disk may be suppressed to ±0.2 mm at the greatest.

FIG. 4 shows a result of measurement of the disk displacement for one rotation of the optical disk made of a glass substrate and enclosed within the casing by rotating the disk at 3600 rpm.

As will be seen in the figure, the disk displacement is confined to within ±0.015 mm. This in turn means that the upper and lower spaces or gaps between the optical disk and the inner surfaces of the casing can be selected 0.015 mm, respectively.

In the case of a disk apparatus in which only the optical disk is loaded without being encased within the casing, projections or platforms may be provided within the disk apparatus at locations corresponding to both sides of the disk, respectively, to thereby suppress the disk displacement to substantially same effect as in the case of the disk-in card.

As a recording medium, there may be used a phase-change type rewritable recording film of In Sb Te alloy. In that case, power required for the recording or writing is 10 mW at the recording surface of the disk.

In the case of the illustrated embodiment, such objective lens may be used which has an effective diameter of 2 mm, a working distance of 0.4 mm, magnification of 0.3, and a numerical aperture (NA) of 0.52. With this magnification, there can be realized the light utilization efficiency of 40% which is comparable to the efficiency realized in an infinite conjugate optical system.

As the light source, a laser diode may be used which has a wavelength of 830 nm and a power of 30 mW. In that case, light energy of 12 mW is available at the film surface of the recording medium. Distance between the objective lens and the light emitting point may selected 6.4 mm. The thickness of the optical head as measured between the bottom surface of the chassis and the top end of the objective lens, inclusive of the chassis bottom wall thickness, for example, of 1 mm will then be 5.5 mm.

FIG. 5 shows a relation existing between the magnification of the objective lens and the light utilization efficiency.

As can be seen from FIG. 5, in order to realize the optical disk apparatus in which the light utilization efficiency exceeds 25%, magnification of the objective lens used in the optical head has to be higher than 0.2 inclusive. Taking into account the conditions imposed on the manufacturing of the objective lens, however, the upper limit of magnification will be 0.35 with that of the light utilization efficiency being 50%.

Figure 6:
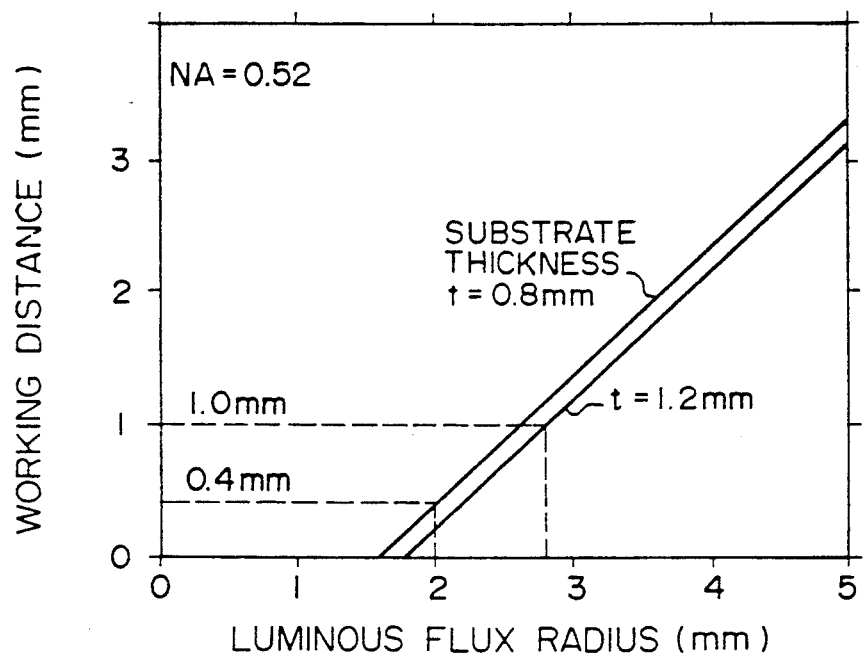
FIG. 6 is a view for graphically illustrating a relation between a luminous flux diameter and a working distance of lens.
Figure 7:
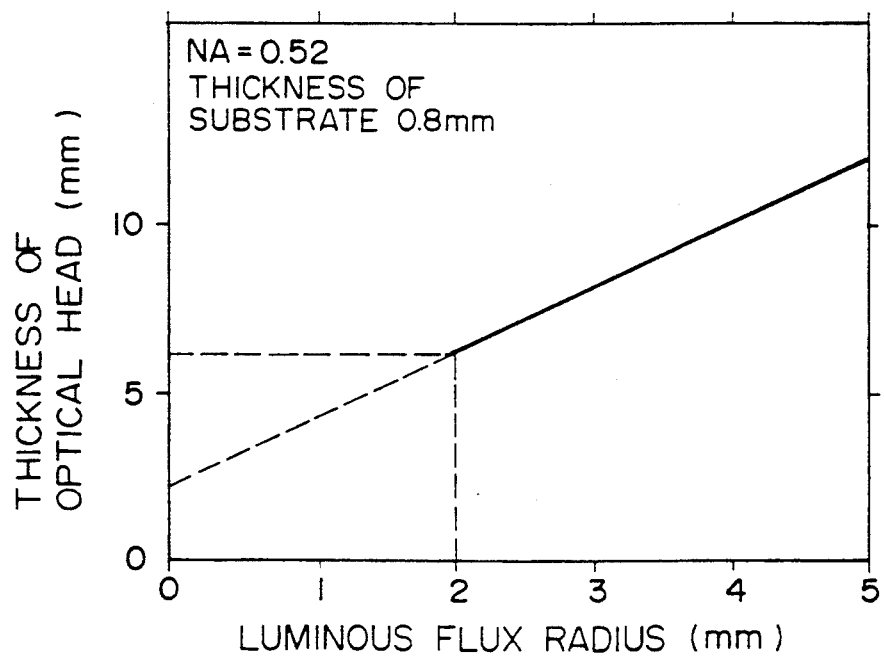
FIG. 7 is a view for graphically illustrating a relation between a luminous flux diameter and a thickness of an optical head.

FIG. 6 shows a relation between the luminous flux diameter and the working distance in the case where the numerical aperture of the objective lens is 0.52. It can be see from FIG. 6 that the working distance becomes shorter as the distance between the objective lens and the optical disk is decreased, whereby the diameter of the objective lens (luminous flux diameter) can be reduced. FIG. 7 shows a relation between the luminous flux diameter and thickness of the optical head. As can be seen from FIG. 7, the optical head can be made thin by decreasing the luminous flux diameter. Because the risk of direct contact between the rotating optical disk and the objective lens can be avoided owing to the interposition of the casing and because the disk displacement can be suppressed to 0.4 mm or less, working distance may be selected to be 0.4 mm.

Furthermore, by decreasing the substrate thickness from 1.2 mm, the luminous flux diameter can further be decreased. By way of example, in case the sum of thickness of the optical disk and that of the casing is decreased from 1.2 mm to 0.8 mm, the luminous flux diameter is 2 mm, when the working distance is 0.4 mm. With the luminous flux diameter of 2 mm, thickness of the optical lead is 6 mm. In case the sum of thickness of the optical disk and that of the casing is 0.8 mm, thickness of the optical head can be reducing to 5 mm. By taking advantage of these relations, thickness of the optical head can further be decreased by making smaller the thicknesses of the optical disk and the casing.

Figure 8:
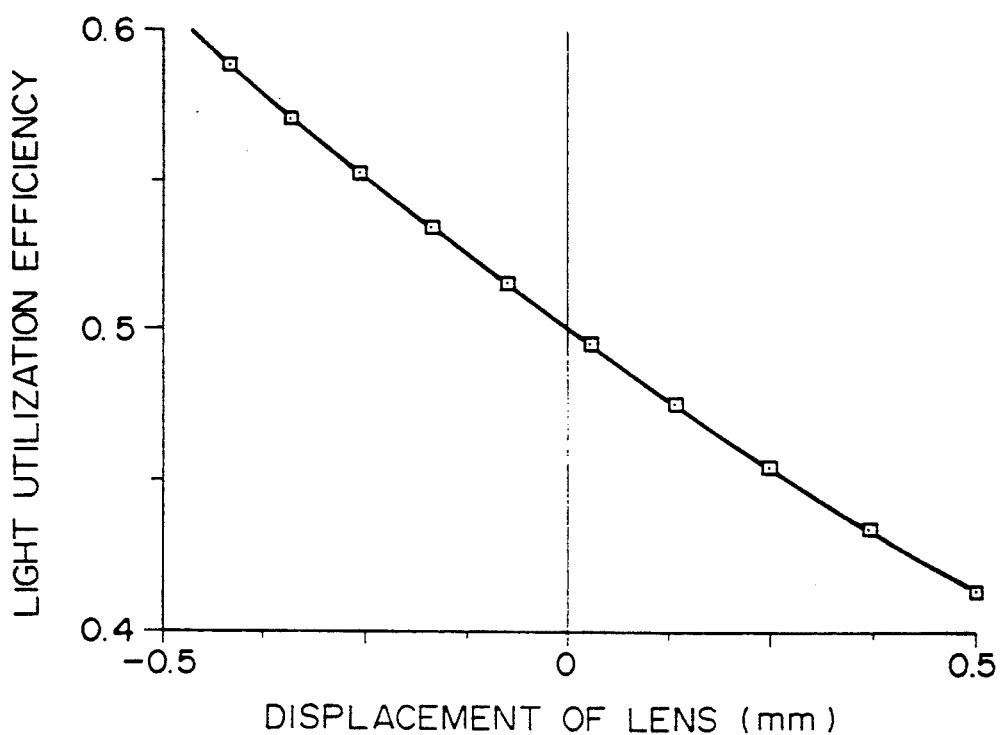
FIG. 8 is a view for illustrating graphically displacement of a lens upon focusing operation and the light utilization efficiency.

FIG. 8 shows a relation between displacement of the objective lens upon focusing operation and the light utilization efficiency. Displacement or move of the objective lens in the positive direction indicates the move of the objective lens toward the optical disk. The relation shown in FIG. 8 is observed when the numerical aperture of the objective lens is 0.52, aperture diameter is 2 mm and when magnification is 0.3.

When light energy on the optical disk varies upon data writing, recording or writing failure will take place due to excess or shortage of light energy. Accordingly, it is desirable that variation in light energy on the recording surface of the optical disk be less than 10%. To this end, the focusing move of the objective lens should not exceed ±0.25 mm, as can be seen in FIG. 8.

At that time, design value of the light utilization efficiency will become 50%. So far as the light utilization efficiency remains lower than 50%, tolerance of the disk displacement for variation of the light utilization efficiency may be increased. However, due to increase in the aberration in accompanying the move of the lens, the beam diameter is increased to thereby make the writing impossible. For performing the writing operation by using the finite conjugate optical system, the disk displacement will have to be reduced to within ±0.25 mm. The disk displacement or waving motion is brought about by vibration of a motor shaft, camber of the disk substrate and low precision of a disk mounting hub. However, it is difficult to limit the disk displacement to within ±0.01 mm without resorting to the measures for suppressing the disk displacement, even when the abovementioned factors are improved.

The lens diameter can be decreased owing to suppression of the disk displacement. Since the reduced lens diameter allows the apparatus to be implemented in a small size, it is desirable to select the lens diameter to be smaller than 4 mm inclusive. However, because of difficulty encountered in manufacturing the lens of a smaller diameter, the lens diameter of 1 mm will be a lower limit.

Description will now be made of the disk displacement by reference to the result of measurements performed for typical disks.

Figure 9:
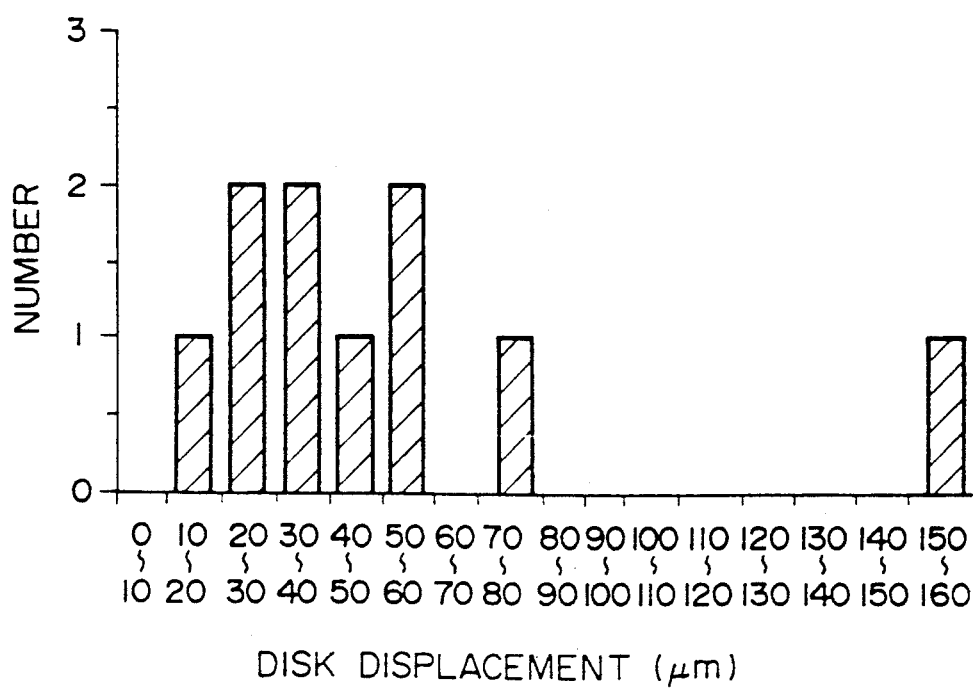
FIG. 9 is a view for graphically illustrating a distribution of disk displacements.

FIG. 9 shows disk displacements actually measured for disks each constituted by a substrate suffering little camber and having a hub mounted with high precision and rotated by using a motor suffering less vibration of the motor shaft. More specifically, disk displacement was measured for ten specimens formed of glass substrate and having a diameter of 2 inches at the outermost periphery thereof by rotating the glass substrates at a speed of 3600 rpm. The displacement was ±10 μm at the least. Most of the disks underwent displacement not exceeding ±60μm. The phase-change type optical disk made of a In Sb Te alloy has been found to be overwritable without taking any measures for suppressing the disk displacement. Magnitude of the displacement of the PC substrate having a diameter of 2 inches was in a range of ±150 μm to ±400 μm. The displacement can however be suppressed by housing the disk within the casing.

Figure 10:
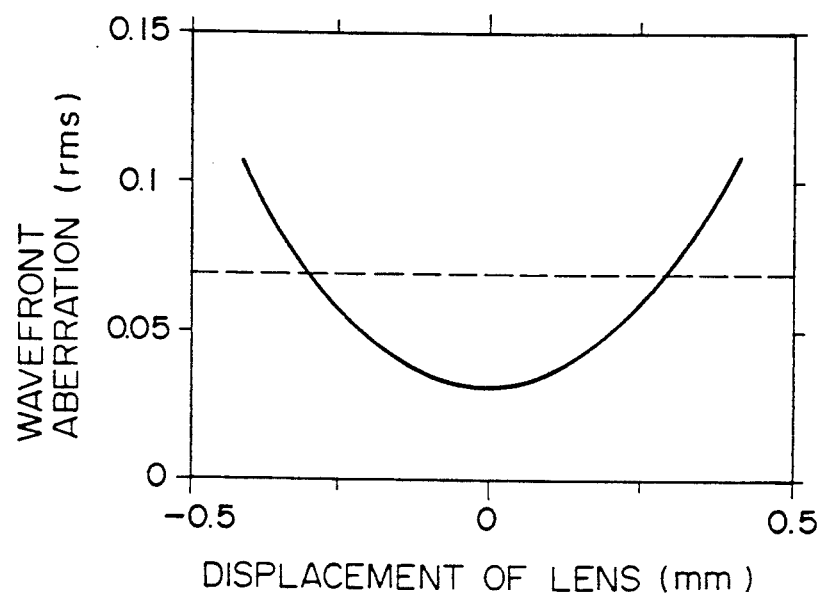
FIG. 10 is a view for graphically illustrating a relation between displacement of a lens upon focusing operation and wavefront aberration.

FIG. 10 shows a relation between the tracking move of the objective lens and aberration. Aberration other than those making appearance in accompanying the displacement of the objective lens is 0.03 λ for the objective lens having a numerical aperture of 0.5, aperture diameter of 2 mm and magnification of 0.2.

As a criterion for the capability of converging light up to the diffraction limit, there is known Maréchal criterion according to which the aberration should not exceeds 0.07 λ (RMS).

As can be seen in FIG. 9, it is preferred that displacement of the objective lens does not exceed ±0.3 mm in order to abide by the Maréchal criterion upon moving the objective lens.

Figure 21:
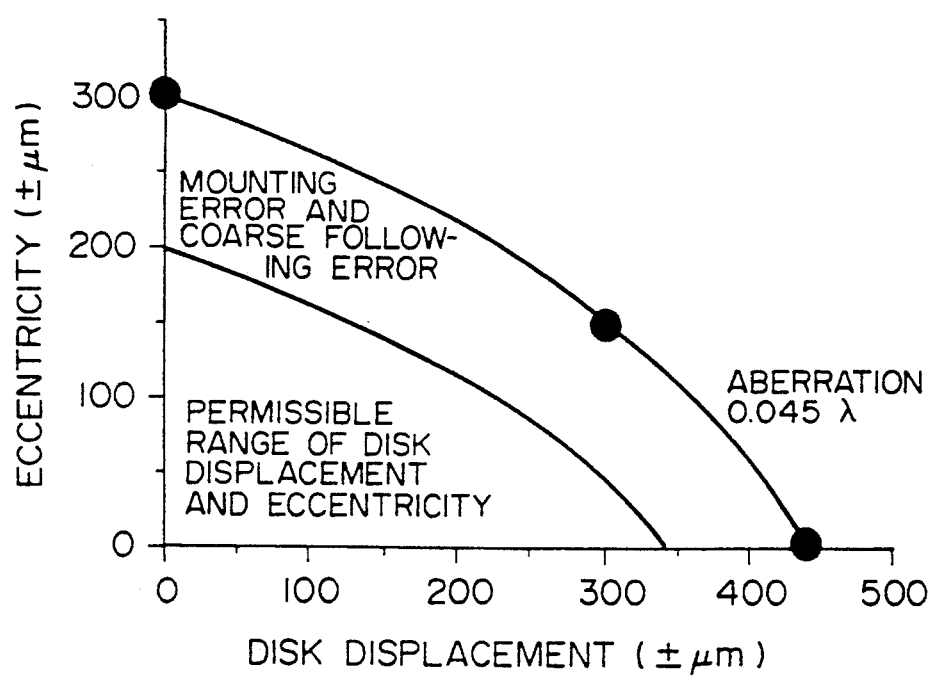
FIG. 21 is a view for graphically illustrating results of measurements performed for determining permissible ranges of disk displacement and eccentricity.

FIG. 21 shows results of measurements performed for determining aberration of the objective lens which is brought about by the disk displacement/eccentricity following operation. The objective lens used in the measurement has an effective diameter of 2 mm, and numerical apertures of 0.52 and 0.14 at the disk facing side and at the side facing the light source, respectively. In FIG. 21, there is shown a range within which the aberration brought about by the objective lens does not exceed 0.045 μ, when the objective lens is moved so as to follow the disk displacement and eccentricity. As the criterion for the aberration which permits the light converged up to the diffraction limit, there is known the Maréchal criterion of 0.07 μ (RMS). In the optical disk apparatus, aberration is brought about by both the optical head and the optical disk. Accordingly, it is preferred to design the optical head and the optical disk so as to tolerate equivalent aberration. To this end, aberration produced by the optical head should be suppressed to 0.05 μ (RMS) or less. In addition to the objective lens, the laser diode and other optical parts provide causes for the aberration. Consequently, aberration due to the objective lens should be suppressed to 0.045 μ (RMS) or less. Such being the circumstance, the range in which the aberration is smaller than 0.045 μ is determined. Additionally, it is noted that error or deviation will inevitably take place between the center axis of the laser beam and that of the objective lens upon assembling the optical head. Besides, error will be involved in the space between the optical disk and the optical head. Usually, it is difficult to reduce these mounting errors to 100 μm or less. Consequently, the range of movement of the objective lens for following the disk displacement and eccentricity is rather narrow. For the reasons mentioned above, the displacement and eccentricity permissible for the disk are limited to within a range indicated by an area in FIG. 21. As can be seen, the displacement has to lie within ±340 μm with the eccentricity being within ±200 μm. In order to tolerate simultaneous occurrence of both disk displacement and eccentricity, it is desirable that the disk displacement lies within ±100 μm with the eccentricity being within ±200 ±m. However, in the case of a structure in which the optical head is moved as a whole for following the eccentricity by using a coarse actuator, the limits of the range of eccentricity permissible for the optical disk may be extended to ±300 μm. Similarly, the permissible range of the disk displacement may be enlarged to ±450 μm by enhancing the accuracy of the optical head positioning adjustment.

In the case of the optical disk of write-once type and rewritable type, the light utilization efficiency has to be sufficiently high. Accordingly, when the maximum power of the light source is low, optical isolation provided by the polarized light splitter and the quarter-wave plate is indispensable for the optical system. When a grating is made use of, the light utilization efficiency tends to be lowered. Accordingly, in this case, there may be adopted a push-pull method or a heterodyne method for the tracking system. As the focusing method, there may be mentioned a Foucault method in which a Foucault prism is used, an astigmatic method in which a cylindrical lens is used, a critical angle method in which a critical angle prism is used and a knife-edge method using a knife edge. The optical parts mentioned above can be formed of a same glass or plastic material as a prism, wherein a composite or compound prism can be fabricated by combining integrally the parts for deriving a focusing error signal such as the polarizing prism, quarter-wave plate, raiser mirror and the knife edge and a part for deriving a tracking error signal.

Figure 11:
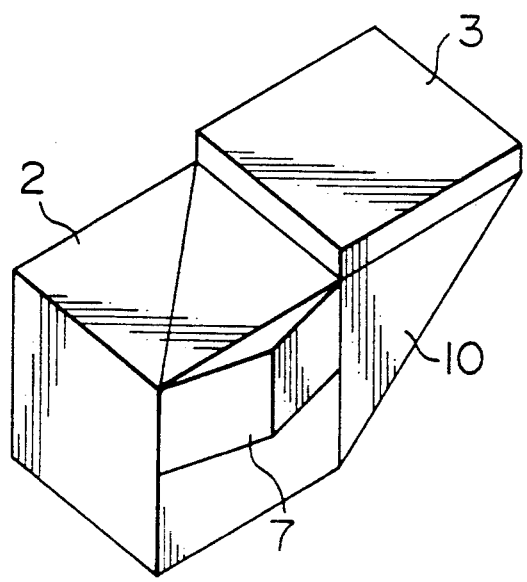
FIG. 11 is a perspective view showing schematically a structure of a compound prism for an optical head according to an embodiment of the present invention.

An embodiment of the compound prism used in the optical head according to the present invention will be described by reference to FIG. 11. In the focusing error signal detecting system, the knife-edge method may be adopted, while the push-pull method may be used as the tracking error signal detecting method. A P-polarized light beam is incident on a polarized light beam splitter 2 and raised up by a raiser mirror 10 to be circularly polarized by the quarter-wave plate 3. Reflected light from the optical disk is converted to S-polarized light by the quarter-wave plate 3 and reflected by the polarized light beam splitter to be detected by a photodetector with four segments. An upper half of the return light beam is inputted to two photodetectors for the tracking signal through the Foucault prism 7. The Foucault prism 7 functions also as a knife edge, wherein the focusing error signal is detected by a center photodetector with two segments. Structure of the error detecting optical system may be modified in conformance with the focusing error detecting method and the tracking error detecting method as adopted. The compound prism according to the instant embodiment may be implemented in a length of 5 mm, width of 2.5 mm and a height of 2.5 mm in conformance with the luminous flux radius. By using this compound prism, the optical system of the optical head according to the instant embodiment may be constituted by four parts, i.e. the laser diode, the compound prism, the lens and the photodetector. By combining integrally the optical parts in this manner, the number of the parts could be reduced and at the same time the number of optical axis adjusting locations which exert significant influence to the performance of the optical head can be decreased considerably, making it possible to effect the optical axis adjustment in a simplified manner. Although no lens is used in the error detecting optical system in the case of the instant embodiment, an error detecting lens may equally be used. In that case, error signal detection sensitivity can be adjusted as well.

In the recording medium formed by using an organic material, light energy required for writing operation may be low as compared with a recording medium formed of an inorganic material. In the organic recording medium, writing operation can be realized with a power of 5 mW at the film surface. When the power of the laser diode is high and when the light utilization efficiency is low, there arises no need for use of the polarized light beam splitter but it is sufficient to use non-polarizing beam splitter such as a half mirror or the like. Further, since the quarter-wave plate is rendered unnecessary, the number of the parts as required can be decreased, which results in reduction of the manufacturing cost.

Next, description will be directed to an embodiment of the optical, disk.

Figure 22B:
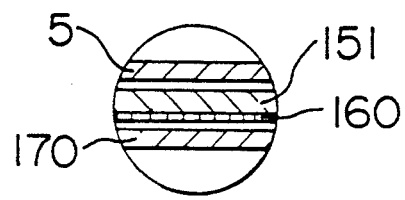
FIGS. 22A–22C show another embodiment of the optical disk assembly according to the invention.
Figure 22A:
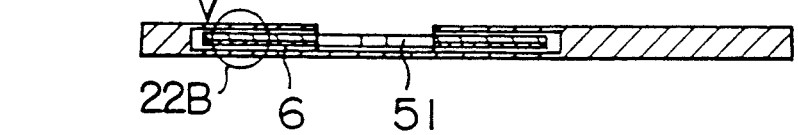
Figure 22C:
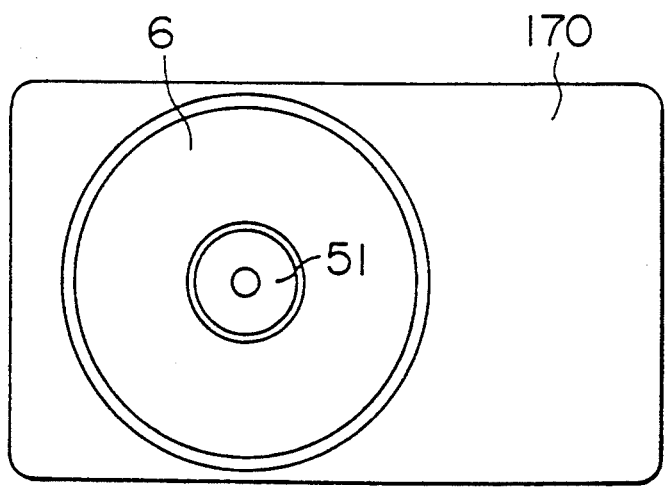

FIGS. 22A-22C show an exemplary embodiment of the optical disk encased within a one-side transparent casing so that the light beam can impinge on the disk through a transparent portion of the casing. In the case of the instant embodiment, the optical disk 6 which is rotated is housed within a transparent casing with rather narrow spatial tolerance for the purpose of suppressing the displacement of the disk 6, which has a diameter of 2 inches (49 mm) and a thickness of 0.5 mm and which may be formed of a glass substrate, a PC substrate or a PMMA substrate. Dimensions of the casing are selected to be of a credit card size for facilitating the handling. By way of example, the casing may be implemented in a length of 84 mm and a width of 54 mm. For convenience of description, the assembly of an optical disk placed within a casing may be referred to as the (optical) disk-in card. In the case of the instant embodiment, an optical disk having only one surface destined for recording/reproduction (hereinafter referred to as one-side write/read type disk) is concerned. Accordingly, the casing is composed of a transparent sheet material 5 which is located at the light beam incident side and a protecting sheet material 170 disposed at the opposite side. The transparent sheet 5 is formed of PMMA. Of course, other material such as glass, PC and the like having uniform transparency may equally be used for forming the transparent sheet or cover 5. The transparent sheet 5 and the protecting sheet or cover 170 are each formed in a thickness of 0.3 mm. The optical disk 6 of 0.5 mm in thickness is accommodated within the casing with inner spaces or gaps between the casing and the disk 6 each being 0.2 mm. Thus, the casing or the disk-in card presents an overall thickness of 1.5 mm. With this structure of the disk-in card, the disk displacement can be suppressed to within ±0.2. A sum of thicknesses of the substrate and the casing sheet through which the light beam transmits is 0.8 mm. An opening or hole is formed in the transparent sheet located at the beam incidence side so that a disk mounting hub 51 can be secured to a motor-driven spindle under magnetic attraction. A region for data recording is delimited between an inner diameter of 34 mm and an outer diameter 48 to realize a storage capacity of 40 MB.

Figure 23B:
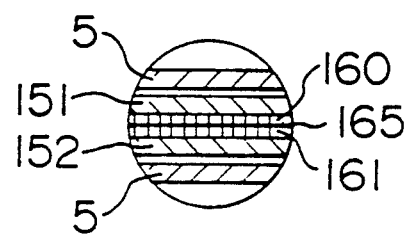
FIGS. 23A–23C show still another embodiment of the optical disk assembly according to the invention.
Figure 23A:
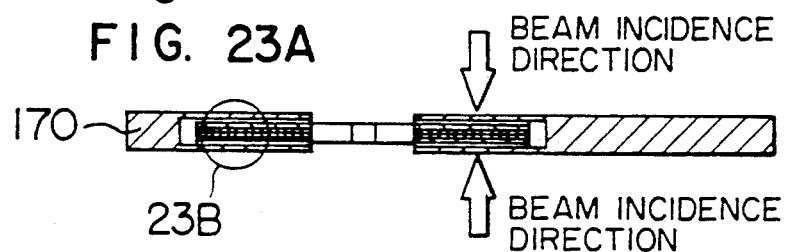
Figure 23C:
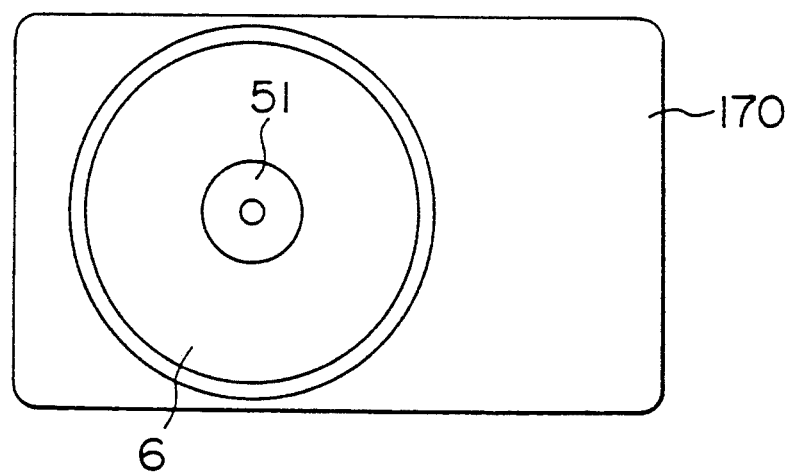

FIGS. 23A-23C show an exemplary embodiment of an optical disk having both surfaces destined for recording/reproduction (hereinafter referred to as both-side write/read type disk). A pair of optical disk substrates 151 and 152 each of 0.5 mm in thickness are bonded together by using an adhesive 165 of UV resin series with recording films or coatings 160 and 161 facing in opposition to each other. The casing is composed of protecting sheets 170 and transparent sheets 5 disposed at both sides of the optical disk 6 and secured to the protecting case portion 170 for defining light beam entrance regions, respectively. Each of the transparent sheets 5 has a thickness of 0.3 mm. Inner spaces between the optical disk 6 and the transparent sheet 5 are each 0.2 mm. The casing or the disk-in card presents an overall thickness of 2 mm. With this structure of the disk-in card, a storage capacity of 80 MB can be realized.

Figure 24:
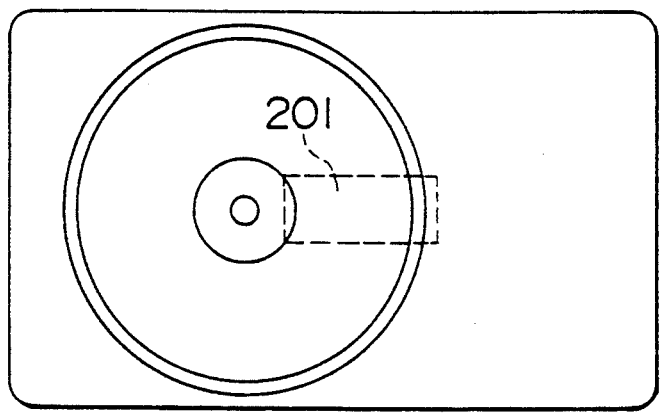
FIGS. 24 and 25 show a further embodiments of the optical disk assembly according to the invention, respectively.
Figure 25:
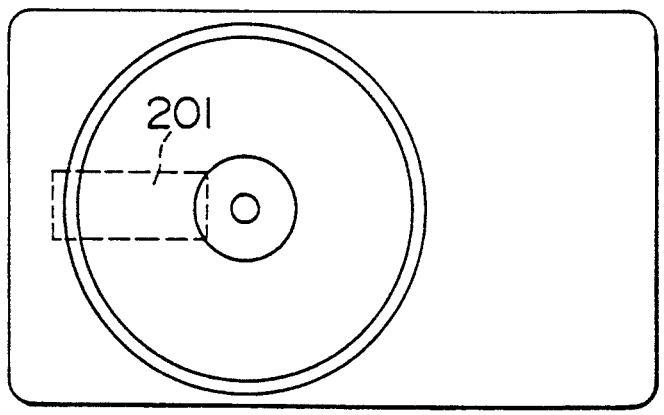
Figure 26D:
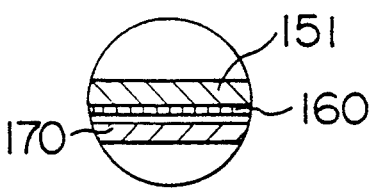
FIGS. 26A–26D show an exemplary structure of a light beam entrance (incidence) window provided in an opaque casing in an optical disk assembly according to an embodiment of the invention.
Figure 26A:
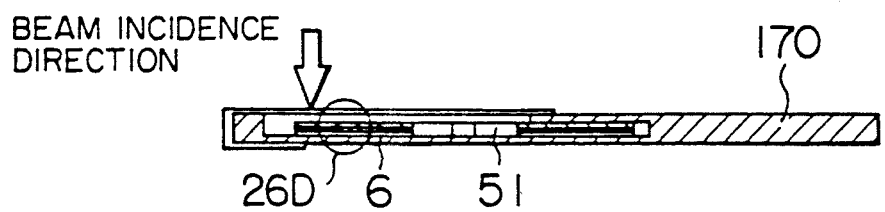
Figure 26B:
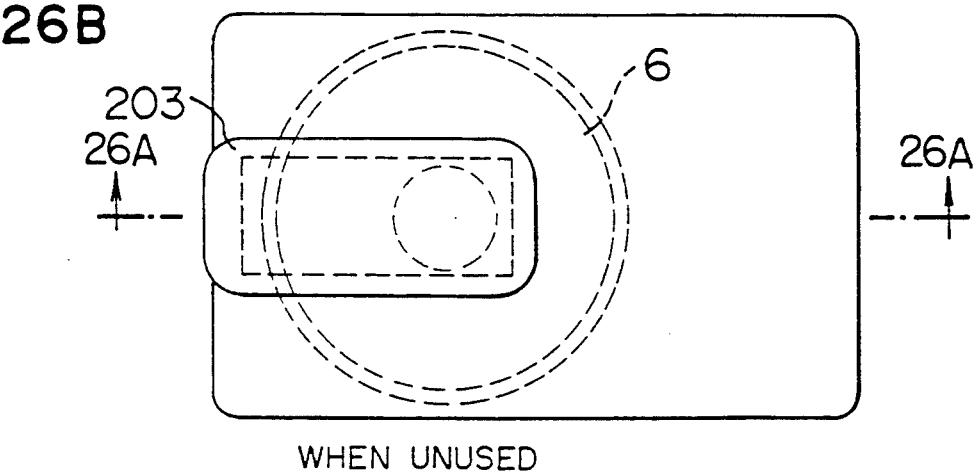
Figure 26C:
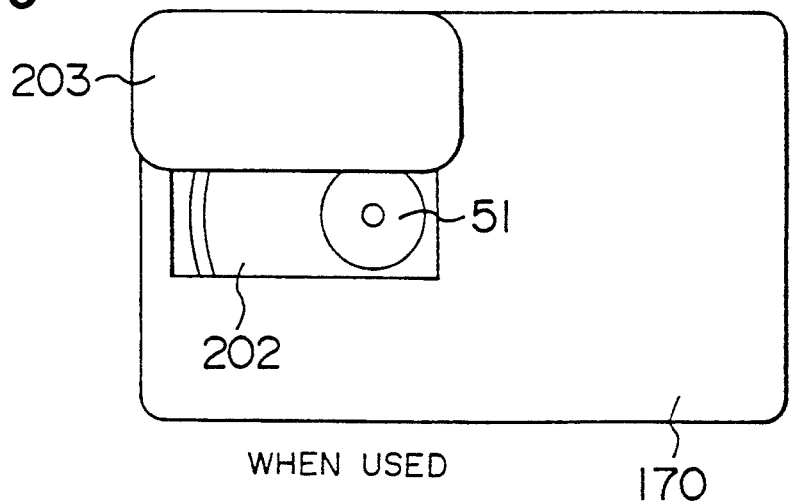
Figure 27D:
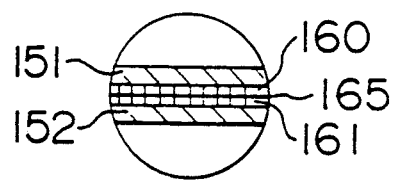
FIGS. 27A–27D show another embodiment of an optical disk assembly of a both side read/write type according to the invention.
Figure 27A:
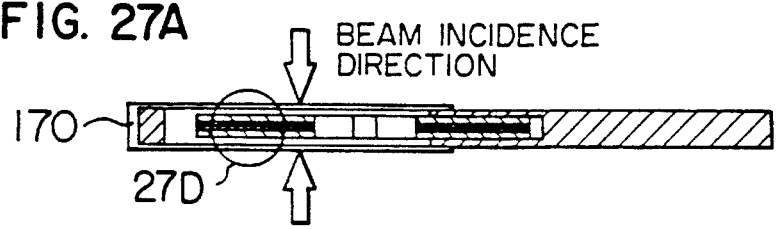
Figure 27B:
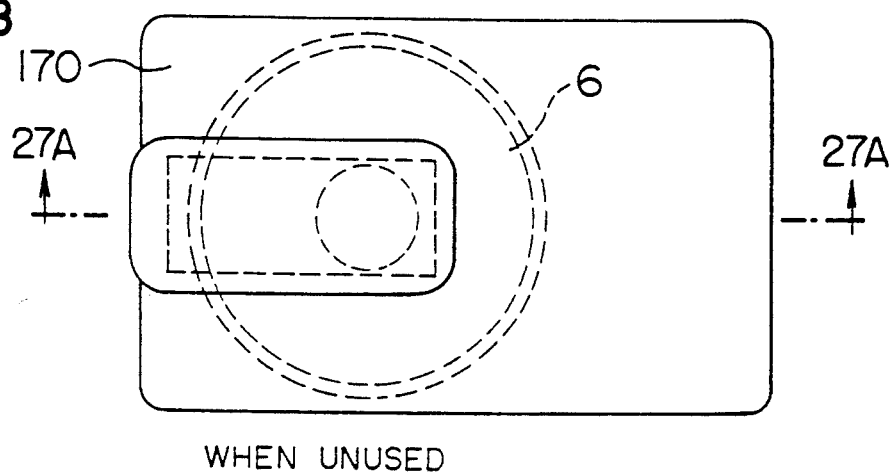
Figure 27C:
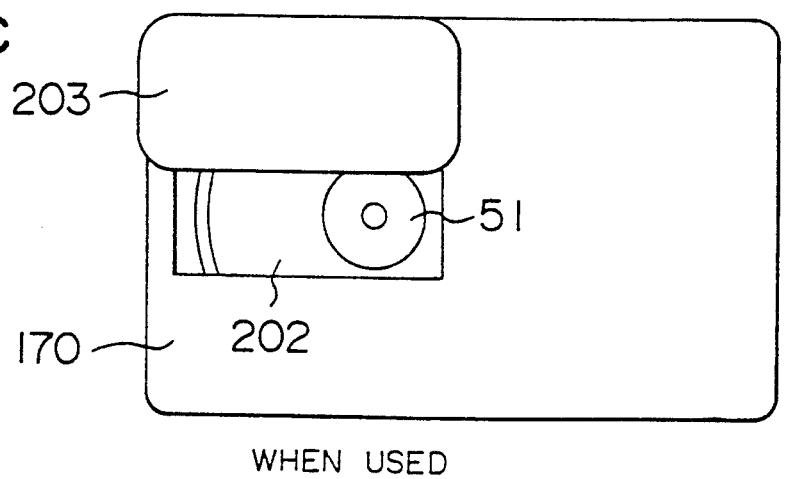

FIGS. 24 and 25 show laser beam incidence or entrance regions, respectively, which are destined to be disposed in opposition to the optical head. In the optical disk-in card of this type, it is preferred to dispose the optical disk such that the center thereof is deviated from that of the casing in the longitudinal direction thereof so that the optical disk-in card can be loaded in the optical disk apparatus in the direction lengthwise of the card by griping the casing at a portion which is not occupied by the optical disk. Accordingly, the light incidence portion should preferably be so provided as to extend in the direction lengthwise of the casing from the center of the optical disk. In the case of the optical disk-in card shown in FIG. 24, the light entrance region or window 201 is provided so as to extend from the center of the optical disk to the center of the casing. On the other hand, in the optical disk-in card shown in FIG. 25, the light entrance window 201 is so provided as to extend in the direction opposite to that of the window 201 shown in FIG. 24. As a modification of the instant embodiment, the whole casing may be made of a transparent sheet material or regions of the casing covering the optical disk may be made transparent or only the light entrance windows may be made transparent. However, in view of the mechanical strength of the optical disk-in card, it is preferred to make transparent only the light entrance window. Further, in consideration of the possibility that the protecting casing 170 and the optical disk 6 may contact each other to injure the disk 6 because of narrow space between the casing 170 and the optical disk 6, eventually making impossible to reproduce the data as recorded, it is preferred to take appropriate measures for preventing the data recording region of the optical disk from contacting the casing.

Figure 12A:
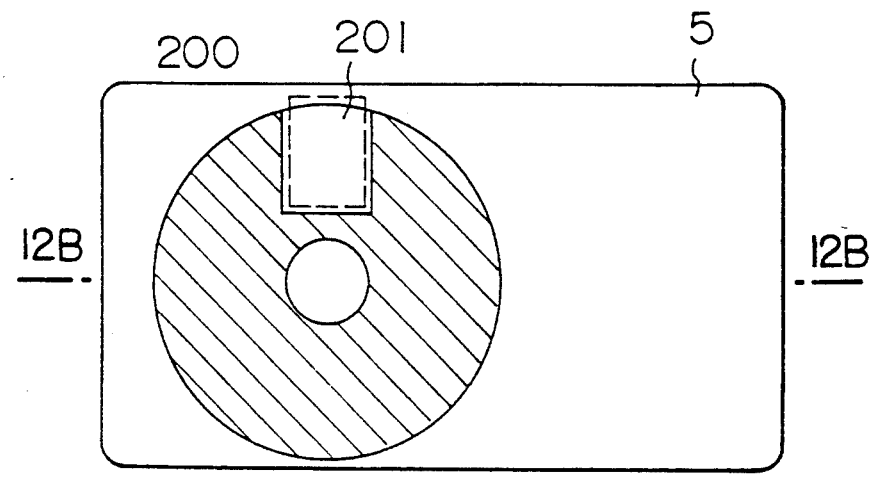
FIG. 12A is a plan view of an optical disk assembly according to an embodiment of the invention in which dust removing cloth is employed for preventing the optical disk from contacting a casing.
Figure 12B:
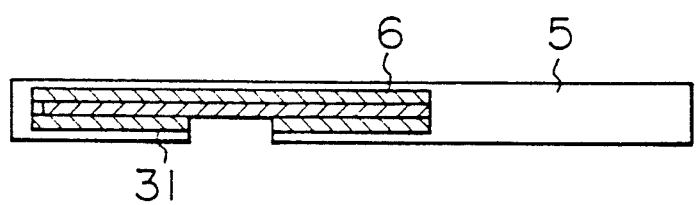
FIG. 12B is a sectional view of the same taken along a line 12B—12B in FIG. 12A.
Figure 13A:
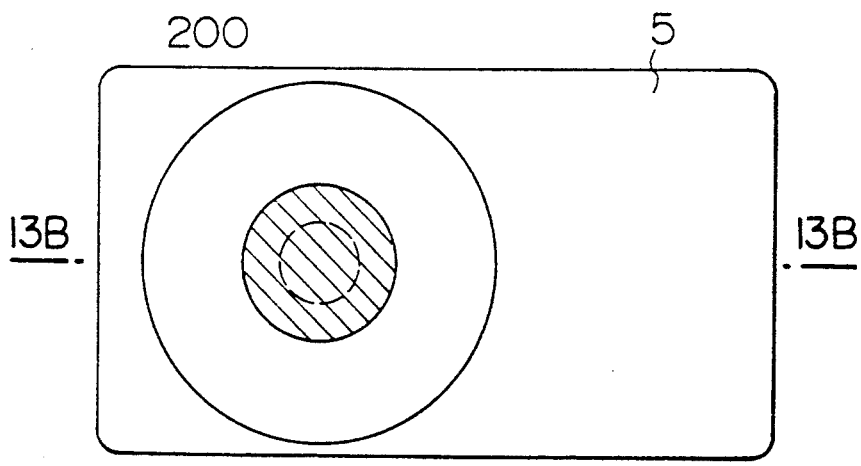
FIG. 13A is a plan view showing another embodiment of an optical disk assembly according to the invention in which a dust removing cloth is used for preventing an optical disk and a casing from contacting each other.
Figure 13B:
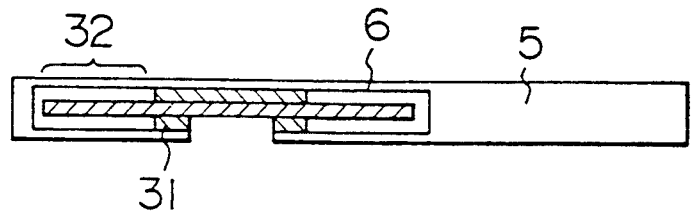
FIG. 13B is a sectional view of the same taken along a line 13B—13B in FIG. 13A.

FIGS. 12 and 13 show an exemplary embodiment of the optical disk-in card 200 for protecting the data recording portion of the optical disk against contacting the casing. When the casing 5 and the optical disk 6 are brought into contact with each other to thereby injure the substrate and the recording medium, it becomes impossible to read out data as recorded.

In the case of the exemplary embodiment shown in FIG. 12, dust removing cloth 31 is interposed between the optical disk 6 and the casing 6 so that the disk 6 can rotate while contacting the soft dust removing cloth 31, to thereby protect the optical disk 6 and the recording medium against being injured. Since dusts deposited on the optical disk 6 is removed by the dust clearing cloth 31 during rotation of the disk, there can be avoided the possibility that the beam incident through the beam entrance portion 201 of the casing is intercepted by the dusts. When the disk 6 is rotated while contacting a rotation guide member such as the dust removing cloth 31, it is preferred that the substrate be formed of a pliable or flexible material such as plastic so that the substrate can be deformed in conformance with the guide member.

In the case of an embodiment show in FIG. 13, a region 32 of the optical disk 6 having data recorded thereon is protected against contacting the casing 5 by using the dust removing cloth 31. According to the instant embodiment of the invention, the dust removing cloth 31 is affixed to the disk at a region which is located radially inwardly of the disk and in which no data is recorded, so that the dust removing cloth can be rotated while contacting frictionally the casing 5. Owing to the structure of the instant embodiment, a data record region or area 32 located radially outwardly of the disk will never be brought into contact with the casing 5 and at the same time the displacement of the optical disk 6 can be mitigated. In the case of the instant embodiment, pliability or flexibility of the dust clearing cloth which is intrinsically producing no dust can be used advantageously. To this end, other material such as cleaning paper, rubber or the like may be used to similar effect.

At this juncture, it should be mentioned that since the disk displacement is suppressed by virtue of the disk-in card structure in which the optical disk is rotated within the casing with narrow spaces between the disk and the inner surfaces of the casing, incidence of the light beam may be realized by forming the casing wholly of a transparent material or providing the transparent window as described above.

FIGS. 26A-26D show an exemplary structure of the light beam entrance (incidence) window provided in an opaque casing. In the case of the instant embodiment, the optical disk 6 has a diameter of 2 inches (65 mm) and is constituted by a pair of substrates bonded together, wherein each of the substrates has a thickness of 0.6 mm. Thus, the optical disk has a same structure as that shown in FIG. 23A-23C. The optical disk is accommodated within a protecting casing 170 which is of such a structure that the light entrance window 202 is tightly covered by a protecting cover 203 when the disk-in card is not used, while when it is used, the protecting cover 202 is opened. A hub 51 is provided for securing the disk onto a spindle of the optical disk apparatus for rotation therewith. The light entrance window 202 is provided on both sides of the protecting casing 170. In order to allow the optical disk-in card to be inserted upset down for using the rear surface, both the light entrance windows are formed in a same configuration. The laser beam of the optical head impinges on the optical disk 6 through the window 202. The dimensions of the protecting casing. 170 are same as those of the casing shown in FIGS. 22A-22C.

FIGS 27A-27D show an embodiment of an optical disk of both-side write/read type in which laser beam entrance (incidence) windows are formed in the casing. The optical disk 6 has a diameter of 2 inches (65 mm) and is constituted by a pair of bonded substrates each of 0.6 mm in thickness. The optical disk 6 is encased within a casing 170. In the unused state, the laser beam window 202 is tightly closed by a protecting cover 203. Upon use of the optical disk-in card, the protecting cover 203 is displaced to open the window 202. The disk is mounted on a motor-driven spindle of an optical disk apparatus through a hub 51 which is designed to be magnetically clamped. The laser beam emitted from the optical head impinges on the optical disk 6 through the window 202. Dimensions of the protecting casing 170 are same as those of the casing shown in FIGS. 22A-22C. The optical disk is of a same structure as that shown in FIGS. 22A-22C. Accordingly, like parts as those shown in FIGS. 22A-22C are denoted by like reference numerals and repeated description thereof is omitted.

Figure 28A:
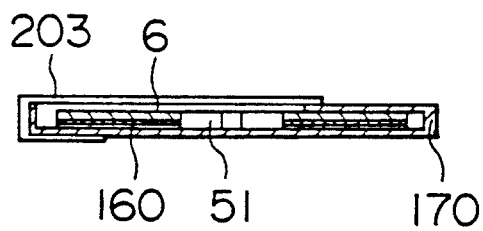
FIGS. 28A, 28B and 28C show still another embodiment of an optical disk assembly according to the invention.
Figure 28B:
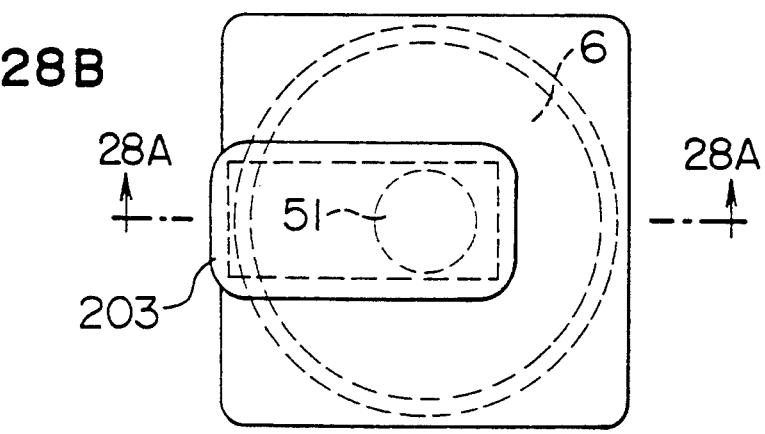
Figure 28C:
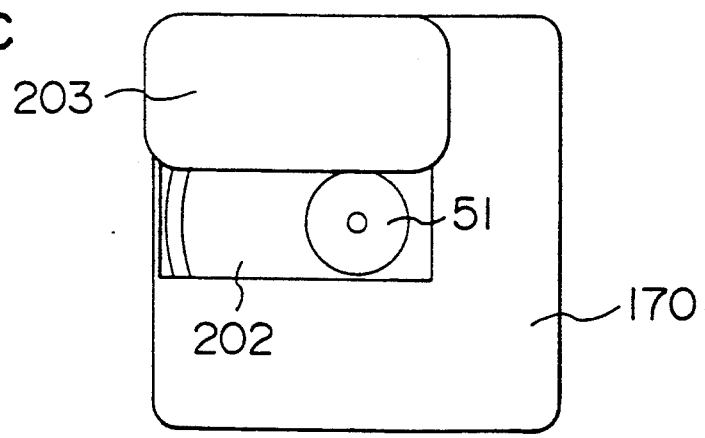

FIGS. 28-28C show still another embodiment of the optical disk-in card. The optical disk 6 is of 2.5 inches (65 mm) in diameter and constituted by a substrate having a thickness of 0.6 mm. With the structure shown in FIGS. 28A-28C, the disk displacement can be suppressed to within ±0.2 mm. For protecting the optical disk against injury and deposition of dust, the optical disk is encased within a protecting casing 170. In the state not used, the beam incidence window 202 is tightly closed by a protecting cover 203.

In using the disk-in card, the window 202 is opened and the optical disk is mounted on a motor-driven spindle through a hub 51. Laser beam of the optical head is incident on the optical disk 6 through the window 202. The dimensions of the protecting casing 170 are 72 mm in length, 72 mm in width and 4.5 mm in thickness. In the case of the instant embodiment, the substrate thickness is reduced in order to further suppress the disk displacement and decrease the thickness of the protecting casing 170. The latter is of such structure as to allow the optical disk 6 to be taken out for the purpose of cleaning the disk.

Figure 14:
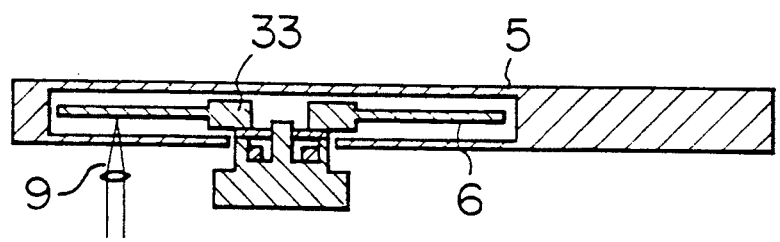
FIG. 14 shows an exemplary embodiment of a structure for suppressing disk displacement.

FIG. 14 shows another embodiment for preventing the displacement or waving motion of the optical disk. According to the instant embodiment, the optical disk 6 is implemented in such a structure in which a projection 33 is provided for the optical disk 6 so that upon occurrence of displacement of the optical disk 6, the projection 33 is first brought into contact with the casing 5 to thereby suppress the displacement of the optical disk 6. The substrate may be made of PC or PMMA by an injection method. The projection 33 may be formed simultaneously with fabrication of the substrate. In that case, there can be attained an advantage that difference between expansion and contraction of the substrate in fabrication thereof can be mitigated owing to the presence of the projection, whereby deformation of the substrate can be suppressed to a minimum. The projection may be 0.1 mm in height and 3 mm in width.

Figure 15:
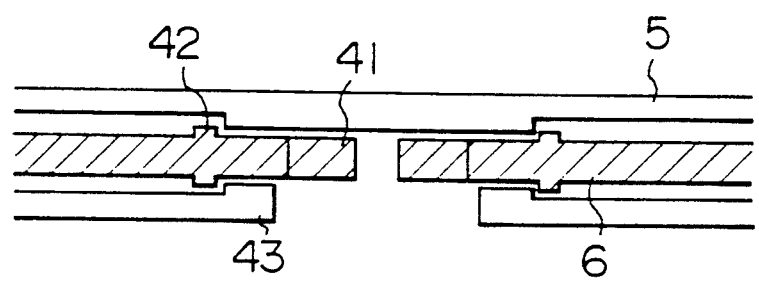
FIG. 15 shows an embodiment of a structure for suppressing influence of disk eccentricity.

FIG. 15 shows a structure for decreasing the eccentricity of the optical disk according to the invention. The optical disk 6 is provided with a projection 42, while the casing 5 is provided with an offset 43 for guiding the optical disk 6. By virtue of provision of the projection 42 and the offset 43, the optical disk 6 is prevented from moving beyond a space defined between the projection 42 and the offset 43 in the direction planewise of the optical disk 6. As a result of this, the eccentricity could be suppressed. By selecting the distance between the optical disk 6 and the casing 5 to lie within ±0.03 mm, eccentricity of the disk 6 may be suppressed to within ±0.03 mm. The projection 42 of the disk 6 may be formed simultaneously with fabrication of the substrate of PC or PMMA. As a result of this, the center of the track can be made to coincide with the center of the projection 42. The hub 41 for securing the disk on a driving unit for rotation is mounted on the disk 6 such that deviation between the center of rotation of the disk and the center of track dose not exceed ±0.05 mm. When the substrate is formed by an injection method, the hub 41 may be formed simultaneously with the fabrication of the substrate. In that case, the center of the hub 41 can be aligned with the center of track with high precision, whereby the disk suffering less eccentricity can be manufactured. Accordingly, no measures for decreasing the eccentricity need be taken. Further, in the case of the instant embodiment, even when the optical disk 6 and the casing 5 are brought into contact with each other due to the displacement of the optical disk, the displacement could be reduced, because the contact occurs at the projection 42 or at a center portion of the optical disk.

Figure 16:
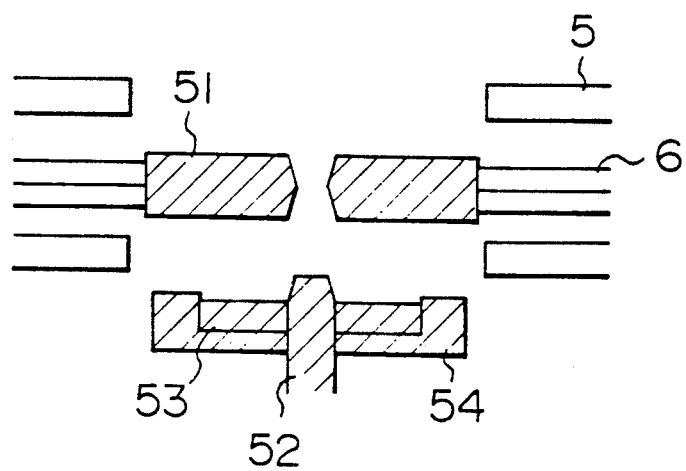
FIG. 16 shows an exemplary structure of a hub and a motor spindle for suppressing the influence of disk eccentricity.

FIG. 16 shows an embodiment for preventing deviation from occurring between the disk and the rotatable shaft of the motor. According to the instant embodiment, the optical disk 6 is secured to the motor shaft 52 by magnetically attracting the hub 51 by a magnet 53 so that the hub 52 is fixedly disposed on a seat 54. In that case, tapered portions are formed in the motor shaft 52 and the hub 51, respectively, so that no gap is produced between the motor shaft 52 and the hub 51. In the case of the instant embodiment, openings for allowing insertion of the motor shaft are formed in upper and lower sheets of the casing with both surfaces of the hub 51 being tapered in order to allow the write operation to be performed on both surfaces of the disk 6. In the case of the optical disk of one-side write/read type, the hub may be tapered only at the side from which the motor shaft is inserted.

In the optical disk apparatus, there may be provided in addition to the two-dimensional actuator a coarse actuator for moving the whole optical head. By means of this coarse actuator, it is possible to cause the whole optical head to follow the eccentricity. When the tracking is carried out while following the eccentricity by moving the whole optical head through the coarse actuator in this manner, displacement of the objective lens is decreased, whereby aberration and the light utilization efficiency are scarcely subjected to variations.

In a disk of 2 inches having an eccentricity of 70 μm and rotated at 3600 rpm, by way of example, displacement of the objective lens may be suppressed to ±10 μm or less by following the eccentricity with the aid of the coarse actuator. As a result of this, writing operation could be performed without resorting to the use of means such as the tapering or the like for reducing the eccentricity of the disk.

Figure 17:
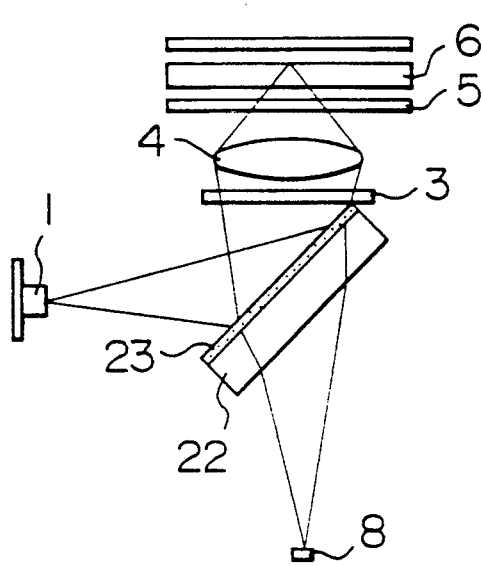
FIG. 17 is a view showing a structure of an optical head and an optical disk according to another embodiment of the present invention.

Another embodiment of the invention will be described. When a cube type polarized beam splitter is employed, diffused light passing through the splitter gives rise to appearance of aberration. Accordingly, such aberration should previously be corrected in designing the lens. Further, the thickness of the beam splitter should strictly be controlled s that the design value is maintained. As a method of guiding the beam to the objective lens without passing through thick glass or the like, there is a method of using a reflection type beam splitter. FIG. 17 shows an embodiment in which the reflection type beam splitter is employed. A polarized light separating film 23 is deposited on a surface of the beam splitter 22 so as to reflect only the light polarized in parallel to the surface of the beam splitter 22. Light is circularly polarized by a quarter-wave plate 3, and the light reflected at the disk 6 is polarized in the direction perpendicular to the incident light by the quarter-wave plate 3 to transmit through the polarized light beam splitter 22 to be detected by a photodetector 8. In order to derive the focus error signal, astigmatism making appearance at the beam splitter 22 may be made use of. Further, an aberration compensating plate and a lens may be inserted for obtaining the error signal with high accuracy and assuring a degree of freedom in optical design. In the case of the instant embodiment, the photodetector 8 is disposed at the side opposite to the disk 6 relative to the beam splitter 22. However, the photodetector 8 may be disposed on a same plane as the laser 1 and the beam splitter 22 by using a raiser mirror.

Figure 18:
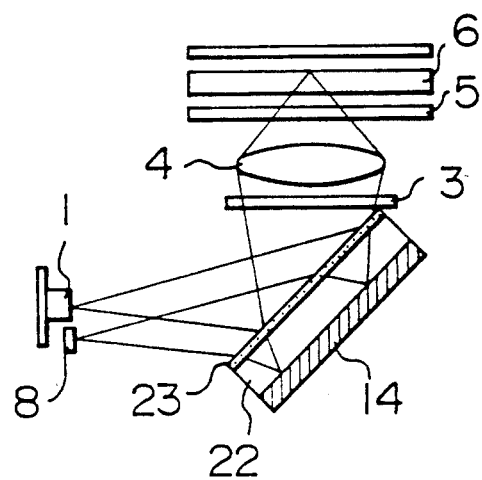
FIG. 18 is a view showing a structure of the optical head and an optical disk according to still another embodiment of the invention.

Another embodiment will be described by reference to FIG. 19. In order to further reduce the size of the optical head according to the embodiment shown in FIG. 18, the laser 1 and the photodetector 8 are disposed in the same direction. A reflector 24 is mounted on a rear surface of the beam splitter 22 for reflecting the detection light beam toward the laser 1. Due to refraction of the beam splitter 22, the reflected light is converged to a location which differs from the light emitting point of the laser 1, whereby the laser 1 and the photodetector 8 can be installed without interfering each other. As described above, according to the conventional method, it was impossible to decrease the distance between the laser diode 1 and the disk 6 to 20 mm or less. In contrast, by encasing the optical disk 6 within a transparent casing 5 according to the instant embodiment, the distance between the laser diode 1 and the optical disk 6 can be reduced to 10 mm. According to the invention, miniaturization of the optical head which could not be realized heretofore can be achieved. The optical head according to the instant embodiment may be implemented in a size of 20 mm in length, 10 mm in width and 5 mm in height.

Figure 19:
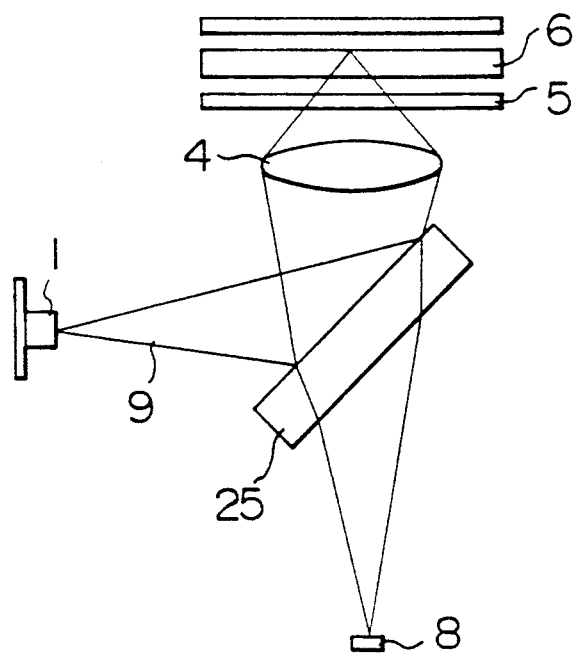
FIG. 19 shows yet another embodiment of the optical head according to the invention in which a half mirror is used.

FIG. 19 shows a structure of an embodiment which can be manufactured at low cost by using a non-polarizing half mirror 25.

In the optical head shown in FIG. 19, the beam 9 from the light source 1 is reflected by a half mirror 25 to impinge on the optical disk 6. Accordingly, when representing the reflectivity of the half mirror 25 by R, the transmittance thereof by T and convergence efficiency of the objective lens by η, the power Pd which can reach the optical recording medium from the light source 1 having a power P is given by $$Pd = \eta RP$$

Since the power reaching the optical disk becomes higher as the reflectivity R is high, it is desirable that $R \geq T$.

In case the light beam emitted from the light source transmits through the half mirror to impinge onto the optical disk, although not shown, it is desirable that $R \leq T$.

By setting the ratio between the reflectivity and the transmittance of the half mirror such that lot of light can reach the optical disk, a power Ps available at the photodetector 8 is given by $$Ps = \eta r\, RTP$$

where r represents the reflectivity of the optical disk. Because the transmittance T is low, the amount of light reaching the photodetector is reduced, resulting in that the reproduced or read-out signal becomes feeble. Accordingly, upon reading, it is desirable to increase the output power P of the light source to thereby make constant the amount of light reaching the photodetector.

In the case of the instant embodiment, a half mirror 25 having the reflectivity R of 70% and the transmittance T of 30% may be employed to thereby increase the power which can reach the optical disk 6. In FIG. 19, similar effects can be obtained even when the positions of the light source 1 and the photodetector 8 are exchanged while allowing the light emitted from the light source 1 to transmit through the half mirror. In that case, the reflectivity and the transmittance are exchanged in magnitude such that $R \leq T$. When compared with a half mirror employed conventionally and having $R = T = 50\%$, the half mirror used in the instant embodiment of the invention has a higher reflectivity, whereby proportion of the light reaching the photodetector 8 is reduced. Accordingly, in the case of the instant embodiment, the reading light beam which was heretofore 1 mW at the film surface should be increased to 1.7 mW to hereby assure the amount of light reaching the photodetector 8 on the same order as with the case of an optical head in which the half mirror having $R = T = 50\%$ is employed. The optical head having the light utilization efficiency of 30% can be manufactured by using an objective lens 4 having magnification of 0.24 which is employed in CD systems. As the light source 1, a laser diode of 50 mW may be used to obtain a power of 10.5 mW at the film surface. By using this optical head, writing operation can be performed on a phase-change type optical disk medium formed of an In Sb Te alloy and having a sensitivity of 10 mW. As the half mirror 25, a cube-type mirror may be employed in place of the reflection type used in the instant embodiment. When a recording medium having a high recording sensitivity such as a medium containing an organic dye is used, it is possible to use a light source of lower power and a half mirror whose difference between the reflectivity and the transmittance is small.

Figure 29:
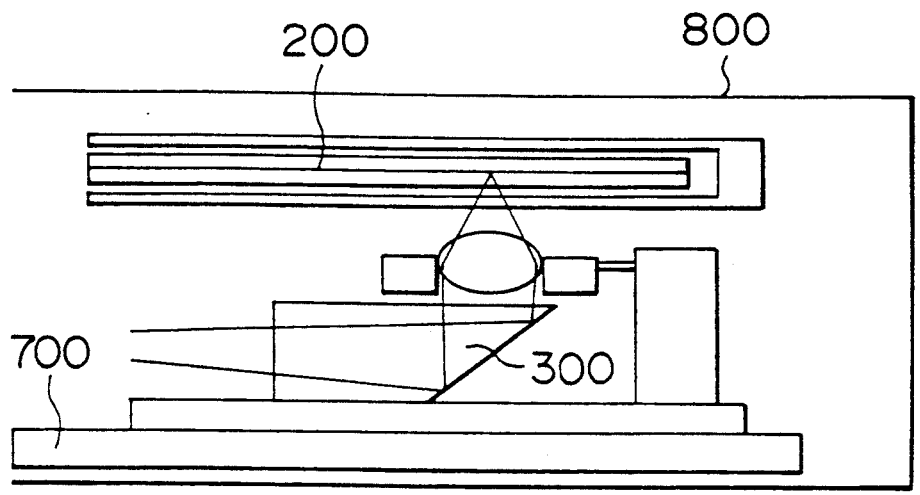
FIG. 29 is a view showing an embodiment of an optical disk apparatus including a combination of an optical disk assembly and an optical head according to the invention.

FIG. 29 is a view showing an embodiment of optical disk apparatus including a combination of an optical disk-in card and an optical head. An optical head 300 is movable in parallel with an optical disk-in card 200 mounted on a coarse actuator 700. These constituent parts are accommodated within a chassis 800 of the optical disk apparatus. In the case of the instant embodiment, the coarse actuator 700 is constituted by a stepping motor having a thickness, for example, of 6 mm and a driving output of about 1N. The optical head 300 is, for example, of 6 mm in thickness and 25 g in weight. The access time is about 100 ms on an average. The optical disk-in card 200 is of the one-side write/read structure and has a thickness of 1.5 mm. The thickness of the optical disk apparatus according to the instant embodiment will be 10 mm exclusive of thickness of a circuit and 15 mm inclusive of the latter. Thus, the optical disk apparatus can be used in lap-top type or notebook-type personal computers and work stations. By implementing the circuit in a LSI of high integration density, the overall thickness of the optical disk apparatus cab be decreased to 12 mm. Although an optical system having a beam diameter of 2 mm should preferably be used, it is possible to replace it by an optical system having a beam diameter of 1.5 mm. In that case, the thickness of the optical head can further be reduced to 4.5 mm with the total thickness of the optical disk apparatus being decreased to 10 mm.

With the structure shown in FIG. 29, it is equally possible to use the optical disk-in card having a window formed in the casing for entrance of the light beam.

The apparatus shown in FIG. 29 can easily be so implemented as to make it possible to use a both-side write/read type optical disk by increasing the thickness of the apparatus only by 0.5 mm. In that case, when data is to be recorded on a rear surface, the optical card-in disk is once withdrawn from the apparatus and inserted therein with upside down.

Figure 30:
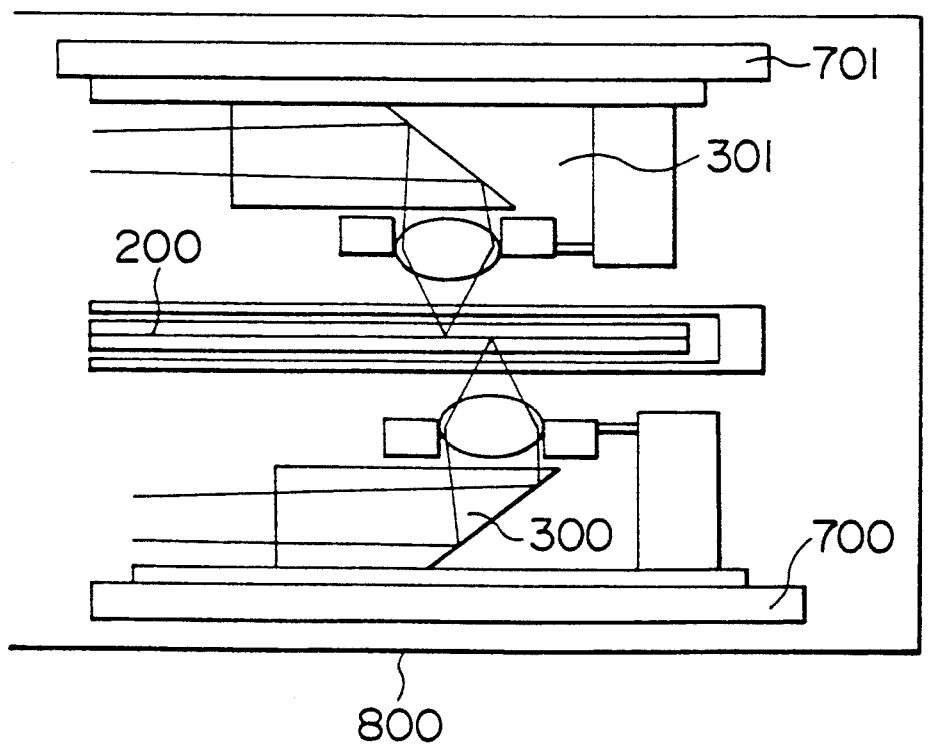
FIG. 30 is a view showing a still further embodiment of the optical disk apparatus according to the invention which is capable of simultaneous write/read operations on both surfaces of an optical disk.

FIG. 30 shows a still further embodiment of the optical disk apparatus which is capable of simultaneously performing write/read operation on both surfaces of the optical disk. Referring to the figure, a first optical head 300 and a second optical head 301 are disposed in opposition to each other with an optical disk-in card being interposed therebetween, wherein the optical head 300 and 301 are mounted on coarse actuators 700 and 701, respectively. With the structure of the optical disk apparatus shown in FIG. 30, data can be written in or read from both surfaces of the optical disk without need for turning upside down the optical disk-in card. Since first and second optical heads 300 and 301 can be driven independent of each other, it is possible to write in or read out two types of data simultaneously. Besides, by driving the first and second optical heads 300 and 301 in synchronism with each other, it is possible to increase effectively the data transfer rate twice as high. The optical disk apparatus of the structure shown in FIG. 30 can be implemented in a thickness of 20 mm so that the apparatus can be used in combination with lap-top type or notebook type personal computers and workstations. The both-side write/read type optical disk may further be realized in such a structure that one surface can function as a ROM with the other surface serving as a rewritable memory. To this end, it is sufficient to deposit on both disk surfaces different types of recording media suited to the intended functions, respectively.

Figure 20:
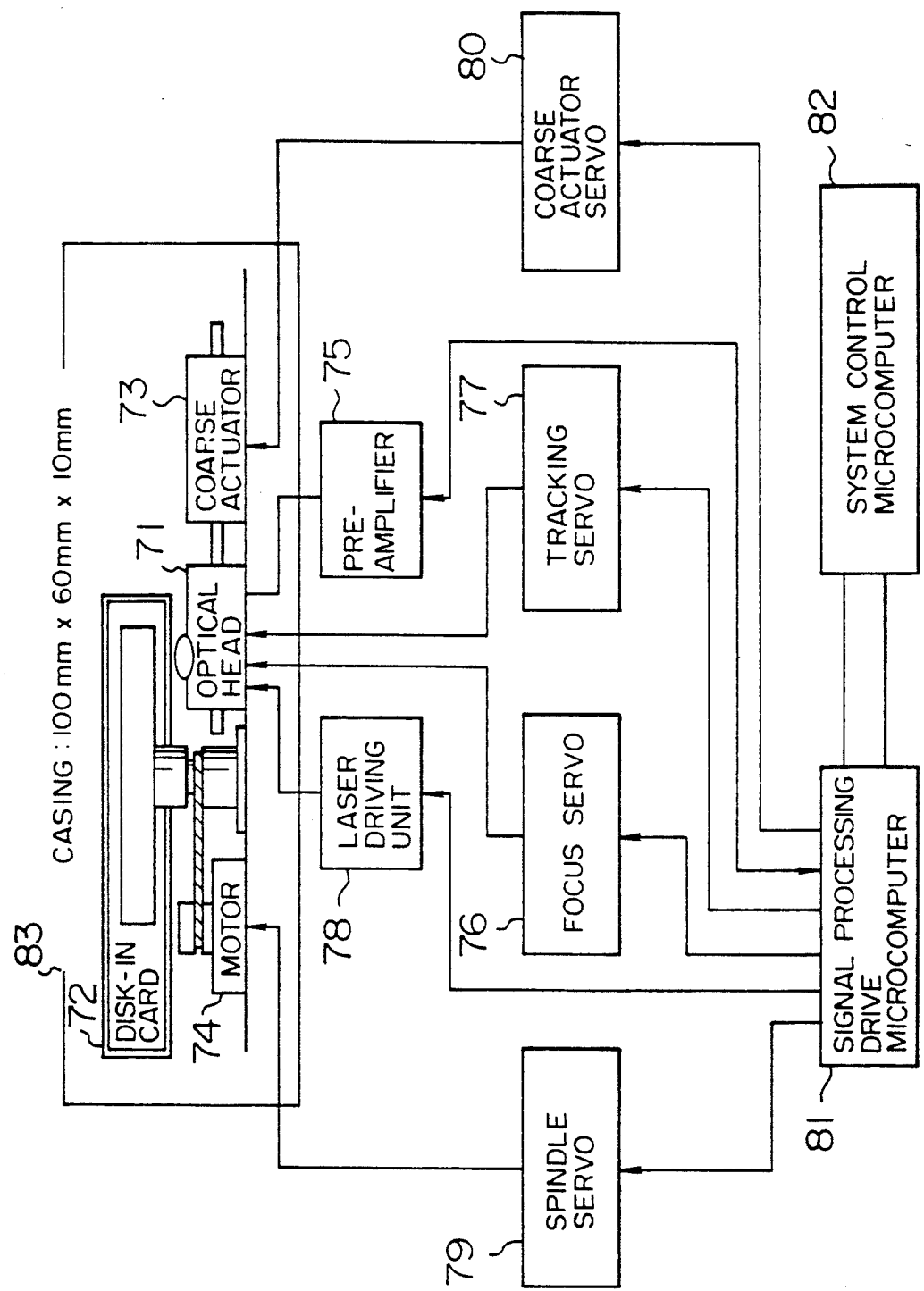
FIG. 20 is a block diagram showing a general arrangement of an optical disk apparatus according to an embodiment of the present invention.

FIG. 20 shows an exemplary embodiment of an optical disk system in which an optical head according to the present invention is employed. A reproduced signal of the optical head 71 passes through a preamplifier 75 and is inputted to a drive microcomputer 81 to be processed. By using the reproduced signal, a focus servo 76 and a tracking servo 77 are effectuated. For modulating the laser power upon recording or writing, a current flowing to the laser is controlled by a laser driver 78. Control of rotation of a spindle motor 74 and control for positioning the optical head 71 by a coarse actuator 73 are effected by a spindle servo 79 and a coarse actuator servo 80, respectively. Signal processing for controlling the focus, tracking, spindle and the coarse actuator is performed by the drive microcomputer 81. Control of the optical disk system is performed by a control microcomputer 82. The optical head 71, a disk-in card 72 having an optical disk encased in a casing, the coarse actuator 73 and the spindle motor 74 can be accommodated within a chassis having a length, for example, of 100 mm, a width of 60 mm and a height of 10 mm. As the coarse actuator, a linear actuator having a thickness of 5 mm may be used. By the spindle motor having a thickness of 5 mm, a disk rotating shaft was driven through a belt or directly. The rotation frequency was 3600 rpm.

Although the present invention has been described in conjunction with the optical head of pit formation type, write-once type utilizing the phase change, rewritable type utilizing the phase change and reproduction-destined type as well as the optical disk apparatus, similar effects can be obtained with an optical head and an optical disk apparatus in which a magneto-optical disk is employed by modifying correspondingly the detection optics.

The optical head according to the present invention can easily be miniaturized with the number of constituent parts being decreased owing to the use of the finite conjugate optical system. Further, because of possibility of miniaturization of the optical head, not only the optical disk apparatus can be implemented in a reduced size but also the time taking for moving the optical head can be reduced, which also means that the time taken for data transfer can be shortened.

In the finite conjugate optical system, aberration becomes minimum when the objective lens and the optical disk are at respective predetermined positions, to thereby allow the light to be converged to the diffraction limit. In the optical disk apparatus, the objective lens is moved in the directions perpendicular to the disk and parallel to the disk upon focusing and tracking. In the optical disk apparatus according to the present invention, aberration making appearance in accompanying the move of the objective lens is insignificant, whereby light can be converged sufficiently.

Due to the focusing and the tracking, the light utilization efficiency representing the ratio of light energy reaching the recording surface to the light energy outputted from the light source undergoes change. According to the present invention, displacement of the objective lens upon focusing and tracking is small. Accordingly, even with the optical head having a high light utilization efficiency, change in the light utilization efficiency brought about by moving the objective lens can be reduced to a minimum. Thus, an optical head having a high light utilization efficiency can be implemented.

In the optical disk, distance between the light source and the objective lens can be shortened by virtue of suppressed disk displacement and eccentricity. An optical head capable of writing data by using the finite conjugate optical system can thus be realized.

According to the present invention, a high light utilization efficiency could be realized in an optical head using the finite conjugate optical system by mitigating the disk displacement and eccentricity. By virtue of this feature, a miniaturized optical head capable of data recording with a small number of the constituent parts can be manufactured. Because magnification of the objective lens is increased in order to increase the light utilization efficiency, the optical head in which the finite conjugate optical system is employed can be implemented in a structure miniaturized when compared with the conventional optical head because of a shortened distance between the light source and the objective lens. Owing to suppression of the disk displacement, the working distance of the objective lens can be shortened, allowing the optical head to be implemented in a thin structure.

Because of miniaturization of the optical head, the optical disk apparatus can be realized in a small size. Further, owing to high light utilization efficiency, an optical data write/read apparatus can be realized by using the finite conjugate optical system.

We claim:

1. An optical disk apparatus, comprising:
    an optical head for converging diffused light emitted from a light source onto an optical disk to thereby perform at least data writing, said optical head including a finite conjugate optical system having an objective lens with a diameter of 1–4 mm for converging the diffused light emitted from the light source;
    means for rotating said disk;
    means for accommodating said disk holding data at a position bearing a predetermined relation to said head, said means for accommodating including means for suppressing disk displacement of said disk taking place in accompanying said rotation of the disk; and
    a drive circuit for controlling operations of said optical head and said rotating means.

2. An optical disk apparatus, comprising:
    an optical head including a finite conjugate optical system for converging diffused light emitted from a light source onto an optical disk to thereby perform at least data writing, said optical head including a beam spitter for leading the diffused light emitted from the light source to an objective lens and a λ/4 polarization plate for polarizing the light on an optical path between the beam spitter and the objective lens;
    means for rotating said disk;
    means for suppressing disk displacement of said disk taking place in accompanying said rotation of the disk;
    means for accommodating said disk holding data at a location bearing a predetermined relation to said head; and
    a drive circuit for controlling operations of said optical head and said rotating means.

3. An optical disk apparatus according to claim 2, wherein the objective lens has a diameter of 1–4 mm.

4. An optical disk apparatus, comprising:
    at least one optical head including a finite conjugate optical system working on an optical disk holding data and accommodated within a casing having a transparent portion by converging diffused light from a light source onto said disk through said transparent portion, guiding light reflected from said disk to a photodetector for thereby performing at least one of data write, read and erase operations, said optical head including a beam spitter for leading the diffused light emitted from the light source to an objective lens having a diameter of 1–4 mm for converging the diffused light and a λ/4 polarization plate for polarizing the light on an optical path between the beam spitter and the objective lens; and means for accommodating said disk at a position bearing a predetermined relation to said head.

5. An optical disk apparatus, comprising:
an optical head including a finite conjugate optical system working on a rotating optical disk holding data, said disk undergoing displacement not greater than 0.25 mm during rotation, said optical head performing at least data writing on said disk by converging diffused light from a light source through a lens, wherein a working distance between said lens and said light source being 5 to 20 mm;
means for rotating said disk; and
means for accommodating said disk at a position bearing a predetermined relation to said head.

6. An optical disk apparatus, comprising:
an optical head including a finite conjugate optical system working on a rotting optical disk holding data, said disk undergoing disk displacement not greater than 0.25 mm during rotation, said optical head performing at least data writing on said disk by converging diffused light from a light source through a lens having a diameter of 1 to 4 mm to thereby illuminate said disk with 25 to 50% of the light emitted from said light source for performing at least data writing operation onto said disk;
means for rotating said disk; and
means for accommodating said disk at a position bearing a predetermined relation to said head.

7. An optical disk apparatus, comprising:
an optical head including a finite conjugate optical system for performing operation on a rotating optical disk holding data, said disk undergoing disk displacement not greater than 0.25 mm during rotation, said optical head performing at least data writing operation on said disk by converging diffused light from a light source through a lens located at a working distance in a range of 0.25 to 1.0 mm from said light source;
means for rotating said disk; and
means for accommodating said disk at a position bearing a predetermined relation to said head.

8. An optical disk apparatus, comprising;
an optical head including a finite conjugate optical system for performing operation on a rotating optical disk holding data, said optical head performing at lest data writing on said disk by converging diffused light from a light source through a single objective lens having a numerical aperture of 0.5 to 0.6 and a working distance of 0.25 to 1.0 mm from the light source;
means for rotating said disk; and
means for accommodating said disk at a position bearing a predetermined relation to said head.

9. An optical disk apparatus, comprising:
an optical head including a finite conjugate optical system working on a rotating optical disk holding data for performing at least writing of data on said disk by converging diffused light from a light source of a predetermined wavelength through a lens having a predetermined numerical aperture, wherein ratio of said wavelength and said aperture number is in a range of 0.65 to 1.66 $\mu$m with a utilization efficiency of said light being 25 to 50%; and
means for accommodating said disk at a position bearing a predetermined relation to said head.

10. An optical disk apparatus, comprising:
an optical head working on a rotating optical disk holding data for performing at least writing of said data on said disk by converging diffused light from a light source onto said disk with an intensity of 5 to 25 mW through a lens having a magnification m of 0.2 to 0.35, where $m=NA_2/NA_1$, $NA_2$ representing a numerical aperture at the light source side and $NA_1$ representing a numerical aperture at the optical disk side; and means for accommodating said disk at a position bearing a predetermined relation to said head.

11. An optical disk apparatus, comprising a finite conjugate optical system including a light separator for illuminating an optical disk with diffused light from a light source and guiding the light reflected from said disk to a photodetector, a $\lambda/4$ polarization plate for polarizing the light on an objective lens with a diameter of 1–4 mm provided on an optical path between said separator and said disk for converging said diffused light onto said disk to thereby perform at least data writing on said disk.

* * * * *